(12) United States Patent
Chen et al.

(10) Patent No.: US 10,903,031 B2
(45) Date of Patent: Jan. 26, 2021

(54) HYBRID ARC AND GROUND FAULT CIRCUIT INTERRUPTER

(71) Applicant: Ze Chen, Yueqing (CN)

(72) Inventors: Ze Chen, Yueqing (CN); Boon Lum Lim, Singapore (SG); Samuel Raj, Singapore (SG)

(73) Assignee: Ze Chen, Yueqing (CN)

( * ) Notice: Subject to any disclaimer, the term of this patent is extended or adjusted under 35 U.S.C. 154(b) by 325 days.

(21) Appl. No.: 16/166,099

(22) Filed: Oct. 20, 2018

(65) Prior Publication Data
US 2019/0074150 A1   Mar. 7, 2019

Related U.S. Application Data

(63) Continuation-in-part of application No. 15/582,746, filed on Apr. 30, 2017, now Pat. No. 10,410,816.
(Continued)

(51) Int. Cl.
| | |
|---|---|
| *H01H 47/00* | (2006.01) |
| *H01H 50/02* | (2006.01) |
| *H01H 50/44* | (2006.01) |
| *H02H 3/16* | (2006.01) |
| *H02H 1/00* | (2006.01) |
| *H02H 3/33* | (2006.01) |

(Continued)

(52) U.S. Cl.
CPC .......... *H01H 47/002* (2013.01); *H01H 50/02* (2013.01); *H01H 50/44* (2013.01); *H01H 83/144* (2013.01); *H02H 1/0015* (2013.01); *H02H 3/16* (2013.01); *H02H 3/33* (2013.01); *H02H 3/335* (2013.01); *H01H 83/04* (2013.01); *H01H 2083/148* (2013.01); *H01H 2089/005* (2013.01); *H02H 1/0007* (2013.01); *H02H 3/04* (2013.01)

(58) Field of Classification Search
CPC ...... H01H 47/002; H01H 50/02; H01H 50/44; H02H 3/16
See application file for complete search history.

(56) References Cited

U.S. PATENT DOCUMENTS

| | | | | | |
|---|---|---|---|---|---|
| 5,933,063 | A | * | 8/1999 | Keung | .................. H01H 83/20 335/177 |
| 6,998,945 | B2 | * | 2/2006 | Huang | .................. H01H 83/04 335/18 |

(Continued)

*Primary Examiner* — Scott Bauer
(74) *Attorney, Agent, or Firm* — Mei & Mark LLP

(57) ABSTRACT

In one example, a hybrid circuit interrupter may include a three-coil architecture, first coil circuitry, leakage detection circuitry, and a main processing circuit including a processor. The three-coil architecture may include a coil housing, three coils, and a plurality of coil assembly conductors. The coils may be disposed within the coil housing. The coils may be parallel and aligned. The coil assembly conductors may be at least partially disposed within the coil housing. The first coil circuitry may be connected to the first coil and may generate first coil signals. The leakage detection circuitry may be connected to the other coils and may generate a leakage signal. The processor may receive the first coil and leakage signals, determine whether an arc fault exists from the first coil signals, determine whether a ground fault exists from the leakage signal, and generate a first trigger signal if a fault is determined.

25 Claims, 42 Drawing Sheets

Related U.S. Application Data which is a continuation-in-part of application No. 15/269,513, filed on Sep. 19, 2016, now Pat. No. 10,476,252, and a continuation-in-part of application No. 15/393,110, filed on Dec. 29, 2016, now Pat. No. 10,439,387.

(51) Int. Cl.
*H01H 83/14* (2006.01)
*H02H 3/04* (2006.01)
*H01H 83/04* (2006.01)
*H01H 89/00* (2006.01)

(56) References Cited

U.S. PATENT DOCUMENTS

| | | | | |
|---|---|---|---|---|
| 7,298,598 | B1 * | 11/2007 | Morgan | H02H 3/338 |
| | | | | 324/424 |
| 7,864,492 | B2 * | 1/2011 | Restrepo | H02H 1/0015 |
| | | | | 361/42 |
| 8,587,914 | B2 * | 11/2013 | Kamor | H01H 71/10 |
| | | | | 361/115 |
| 2003/0102944 | A1 * | 6/2003 | Leopold | H01H 83/02 |
| | | | | 335/18 |
| 2005/0286184 | A1 * | 12/2005 | Campolo | H02H 1/0015 |
| | | | | 361/42 |
| 2008/0024944 | A1 * | 1/2008 | Gouhl | H01H 83/04 |
| | | | | 361/42 |
| 2014/0218044 | A1 * | 8/2014 | Ostrovsky | G01R 31/50 |
| | | | | 324/509 |

\* cited by examiner

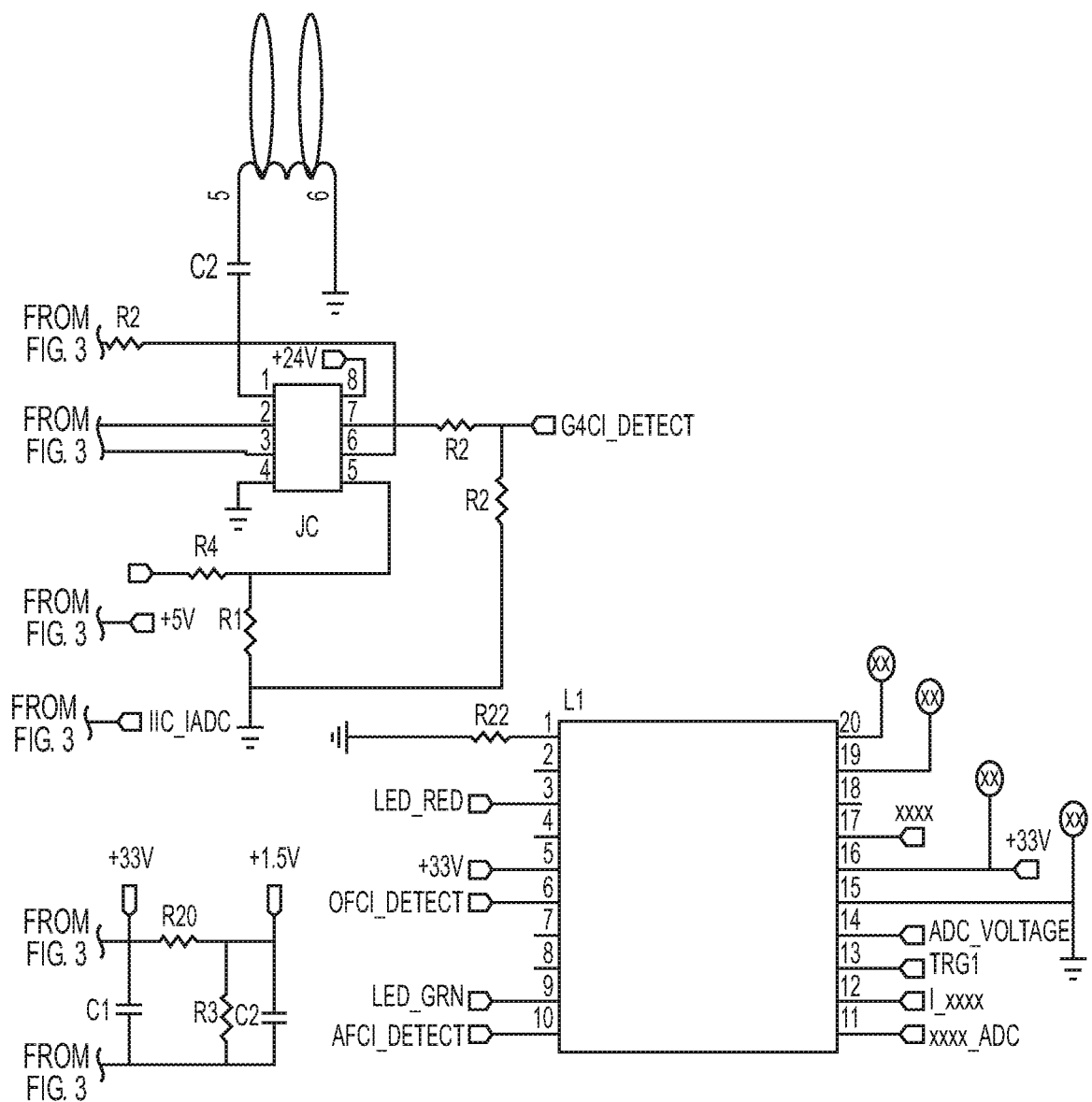
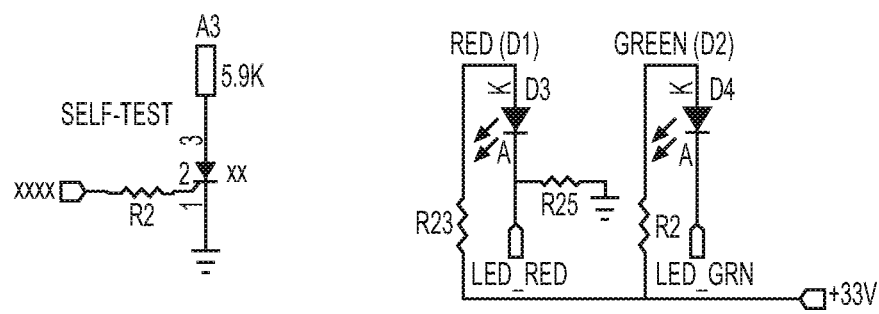
FIG. 3
*Cont.*

HYBRID ARC AND GROUND FAULT CIRCUIT INTERRUPTER

This application is a continuation-in-part of co-pending U.S. patent application Ser. No. 15/582,746, filed on Apr. 30, 2017, which is a continuation-in-part of co-pending U.S. patent application Ser. No. 15/269,513, filed on Sep. 19, 2016, the disclosures of which are both herein incorporated by reference in its entirety. U.S. patent application Ser. No. 15/582,746 is also a continuation-in-part of co-pending U.S. patent application Ser. No. 15/393,440, filed on Dec. 29, 2016, the disclosure of which is herein incorporated by reference in its entirety.

TECHNICAL FIELD

The present disclosure relates to apparatuses, systems, and algorithmic methods for evaluating potential ground fault phenomenon and potential arc fault phenomena, in particular within a circuit interrupter device. The present disclosure also pertains to circuit interrupter devices.

BACKGROUND

Conventional earth current leakage circuit breakers and over-current fuses are commonly deployed to prevent injuries to people and property from dangerous conditions resulting from, for example, current leakages or fires resulting from electrical faults such as current arcs or severe current leakages. Such devices typically detect the occurrence of certain types of electrical faults to prevent harm to persons and property. However, when such conventional devices are employed, some electrical faults may not be detected and such devices may falsely detect electrical faults where none exist. Such errors may be due to the lack of intelligent ground fault and/or arc fault identification systems in conventional devices.

Ground faults may be commonly defined as the existence of a current imbalance between the supply and the return path wherein an undesirable and significant amount of the unreturned current is leaking, or passing through an object—for example a human body, to the ground. Notably, the passage of electrical current through the human body may cause injury or even death.

A current arc is typically caused by a current surging over separated or poorly contacting electrical surfaces within electrical equipment, for example, in its power cord or in an electrical device itself; or within damaged electrical wiring, such as, within the walls of a building. Current arc electrical faults may be defined as current through ionized gas between the two (e.g., supply-side and load-side) separated or poorly contacting electrical surfaces. Such current arcs are often characterized by sparking and extremely high heat, and as a result can cause electrical fires. For example, electrical fires may start when the heat and/or sparking of a current arc causes insulating material or construction material in the vicinity of the electrical fault to combust. Current arc-caused electrical fires may damage property or even endanger human life.

Unfortunately, conventional circuit breakers, fuses, or Ground Fault Circuit Interrupter (GFCI) protection devices typically cannot detect—and consequently halt—current arc electrical faults, unless a current arc produces sufficient current leakage to the electrical ground to be detected by a GFCI and/or results in a sufficient current imbalance to be detected by leakage current coil circuit. Often, an arc fault does not involve current leaking to a ground conductor or any conducting devices to the ground; it is therefore unlikely to result in a substantial current imbalance between the supply and the load.

Underwriters Laboratories (UL), an American Worldwide Safety Consulting and Certification Organization, provides criteria that ground fault detection and arc fault detection devices (AFCI) must meet in order to qualify as approved detection devices. Such criteria may further require such detection devices to avoid false detection of electrical faults when provided with current draws that may resemble ground faults, such as back-EMF noise or certain pulsed current draws, or may resemble arc faults. UL has also provided criteria requiring mechanisms that prevents the supply of power and/or alerts a user where detection devices are improperly installed, for example, where improper installation may hinder the effectiveness of ground fault or arc fault detection or otherwise cause the detection device to malfunction.

A combination device that protects users and electrical appliances from both ground faults and arc faults may be desired. However, existing devices that combine the functionality of both GFCIs and AFCIs operate by including substantially full sets of both GFCI circuitry and AFCI circuitry. Due to the inclusion of two sets of components, such devices may be undesirably expensive to manufacture, heavy, or have a large footprint. Improved combination or hybrid fault detection and circuit interrupter devices may be desired.

It may further be desired that such combination device comply with UL criteria governing both AFCIs and GFCIs. Because the failure to detect an actual arc fault may result in serious safety hazards, conventional apparatuses are typically over-inclusive when determining the presence of an arc fault. Such conventional apparatuses do not provide for analysis or investigation of the nature of the leakage waveform. While erring on the side of determining that electrical faults exist may have beneficial safety effects, this may increase the frequency of both false positives of arc fault detection and unnecessary tripping of circuit interrupter devices.

It may be desirable for such circuit interrupter devices to detect an end-of-life (EOL) condition. It may also be desirable for circuit interrupter devices to include locking mechanisms to provide additional protection from inadvertent resetting, and to enable an end-of-life (EOL) state, where no further reset operation is possible.

Additionally, there remains a need for a tripping mechanism to ensure a proper, flexible trip operation at the time desired. There further remains a need for such a tripping mechanism to provide automatic and/or manual testing functionality to ensure that the electrical protection devices work properly.

SUMMARY

The present disclosure provides a description of apparatuses, systems, and methods to address the perceived needs and desires described above.

In one example, a hybrid circuit interrupter may include a stacked ladder coils (three-coil) architecture, first coil circuitry, leakage detection circuitry, and a main processing circuit that includes a processor. The three-coil architecture may include a coil housing, a first coil, a second coil, a third coil and a plurality of coil assembly conductors. The first, second, and third coils may be disposed within the coil housing, arranged in parallel, with mylar in between, and with the central point of each coil aligned. The plurality of coil assembly conductors may be at least partially disposed within the coil housing, with a portion arranged parallel to the stacked coils. The first coil circuitry may be connected to the first coil and may be configured to generate first coil signals. The leakage detection circuitry may be connected to the second and third coils and may be configured to generate a leakage signal. The processor may be configured to receive the first coil signals from the first coil circuitry, receive the leakage signal from the leakage detection circuitry, determine whether an arc fault exists based on the first coil signals, determine whether a ground fault exists based on the leakage signal, and generate a first trigger signal if a ground fault, an arc fault, or both is determined to exist. An innovative mechanical design of the stacked ladder coils (three-coil) couple with corresponding placement of its a printed circuit board assembly (PCBA, or main board) boards is also invented to secure the 3-Coil detection structure and its respective assembly structure.

In another example, the hybrid circuit interrupter may include a trip coil assembly. The trip coil assembly may be configured to trip the hybrid circuit interrupter upon receiving the first trigger signal.

In yet other examples, the first coil may have 150-250 turns, the second coil may have 900-1100 turns, and third coil may have 900-1100 turns.

In yet another example, the first coil signals may include an RMS voltage signal, an RMS current signal, and a rectangular waveform derived from the RMS current signal. The processor may be further configured to determine that an arc fault exists if: a pulse-width of a low of the rectangular wave form exceeds a predetermined amount of time, the maximum current of the rectangular wave form is above a current detection threshold, and the duty cycle of the rectangular wave form is above a maximum duty cycle detection threshold or below a minimum duty cycle threshold for at least a threshold number of cycles within a predetermined measurement window. The predetermined amount of time may be approximately 1 ms. The current detection threshold may be approximately 5 A. The maximum duty cycle detection threshold may be at or between 55% and 60%. The minimum duty cycle detection threshold may be at or between 40% and 45%. The threshold number of cycles may be 3.5 cycles of the duty cycle. The predetermined measurement window may be at least 1.5 seconds.

In yet another example, the processor may be further configured to determine that an arc fault exists if: the RMS current is greater than a maximum current threshold for at least a predetermined measurement window, and the RMS voltage is less than a minimum voltage threshold for at least a predetermined measurement window. The maximum current threshold may be approximately 70 A. The minimum voltage threshold may be approximately 50V. The predetermined measurement window may be one AC period.

In yet another example, the processor may be further configured to determine that an arc fault exists if a pulse count of the rectangular wave form is more than that a predetermined pulse count for a predetermined number of periods. The predetermined pulse count may be one pulse. The predetermined number of periods may be one AC period.

In yet another example, the hybrid circuit interrupter may include a leakage simulation circuit.

In yet another example, the hybrid circuit interrupter may include a failsafe circuit. The failsafe circuit may be configured to provide an alert when power is provided to the hybrid circuit interrupter unless the processor provides a failsafe signal.

In yet another example, an innovative mechanical architecture and structure for the implementation of the detection coils for the detection of both ground faults and arc faults, the stacked ladder coils (three-coil) structure are introduced. Such architecture and structure effectively and efficiently combine both the ground fault and arc fault detection within a three-coil mechanism, where optimizing the physical structure, positioning securing and signal extraction for the three-coil device.

In yet another example, the hybrid circuit interrupter comprises an active reset procedure allowing the interrupter to perform a reset even if not energized.

In yet another example, the hybrid circuit implements a universal reversible connecting architecture, allowing the full operation or full function of both the AFCI and/or GFCI even if the installation connecting structure is done in reversed manner.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate certain embodiments of the present disclosure and together with the description, serve to explain the principles of this disclosure.

FIG. 5O is a structure assembly diagram of an upper cover component of one embodiment of the current invention.

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

As discussed herein, hybrid circuit interrupter (HCI) 400 may provide the functionality of both a GFCI and an AFCI in a single device. HCI 400 may advantageously detect and evaluate potential ground faults and arc faults; may determine that certain potential electrical faults and not true electrical faults but are rather caused by non-typical current draws by certain electrical appliances; may assess whether certain potential electrical faults are likely to be dangerous and halt the supply of electrical power in response; and may include a mechanism to prevent power supply when HCI 400 is improperly installed.

Figure 1A:
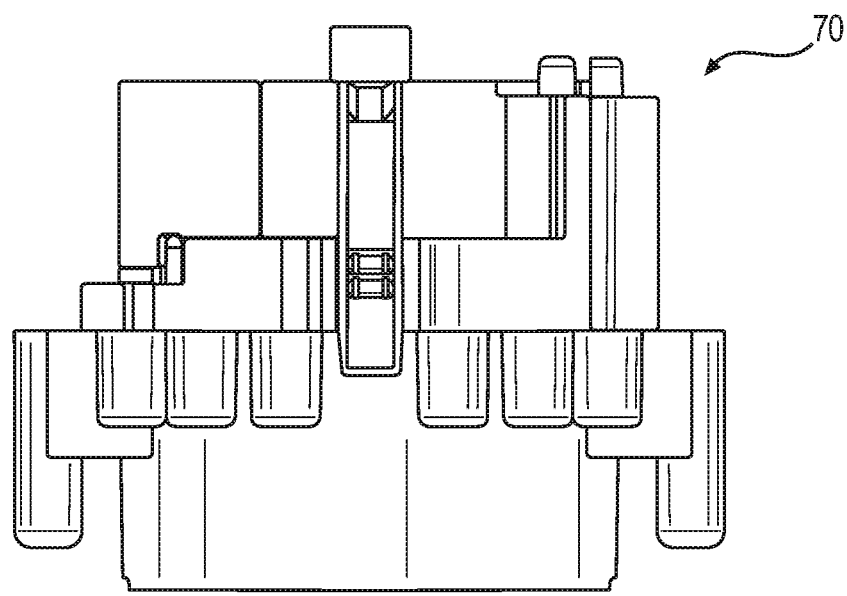
FIGS. 1A and 1B are front and cross-sectional views, respectively, of a coil housing of a hybrid circuit interrupter, consistent with the present disclosure.
Figure 1B:
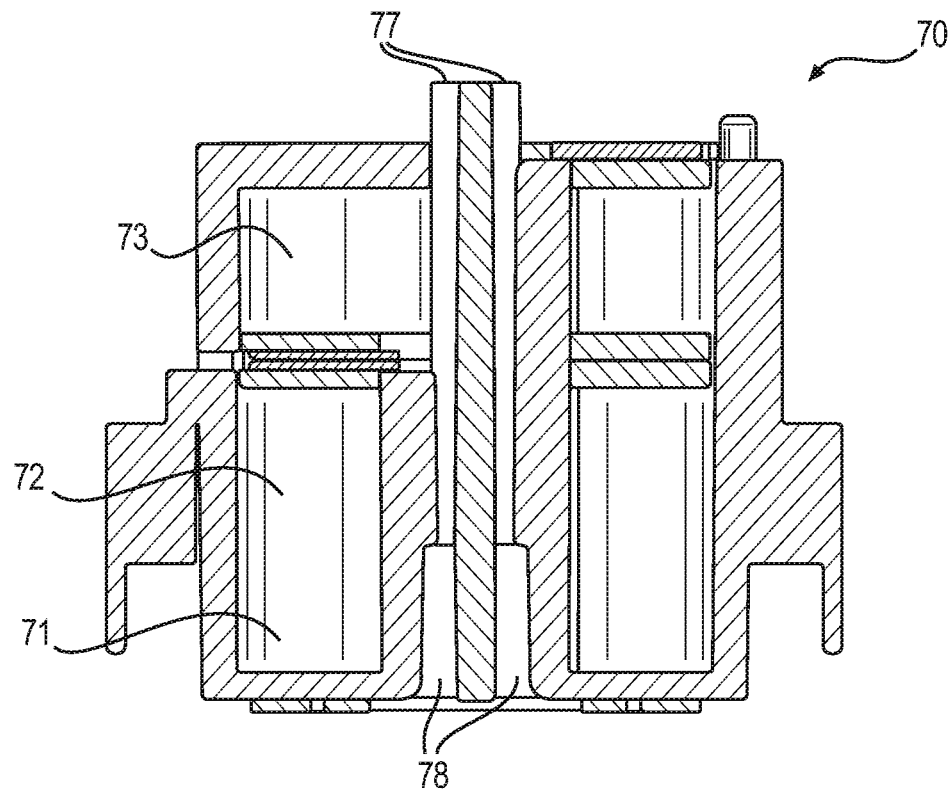

HCI 400 may include a three-coil architecture to generate signals to be used both arc fault detection and ground fault detection. With reference to FIGS. 1A-1D, the three-coil architecture may be contained in coil housing 70. FIG. 1A provides a front view of coil housing 70. FIG. 2A provides a cross-sectional view of coil housing 70 that illustrates exemplary positioning of coils 71, 72, and 73. Coil housing 70 may further include two upper central recesses 77 and two lower central recesses 78. Each upper central recess 77 may connect to its respective lower central recess 78. In certain embodiments coil 72 is disposed upon coil 71, but they are not electrically connected.

Coil 71 may be directed towards ground-neutral fault detection. Coil 71 may generate a signal that to becomes attenuated as frequency increases and loop gain decreases. Importantly, frequency may increase when there is a ground-neutral fault occurrence. In certain embodiments, coil 71 may have a ratio of ~150 to 250:1 turns about the line surrounded by the coil. Coil 71 may operate at a 50 Hz-50 Hz range and may be considered a low frequency coil.

Coil 72 may be directed towards current leakage detection or current imbalance detection. Coil 72 may generate an induced voltage that may be used to assess the presence of a ground fault. In certain embodiments, coil 72 may have a ratio of ~900 to 1100:1 turns about the line surrounded by the coil. Coil 72 may operate at a 2 kHz-20 kHz range and may be considered a high frequency coil.

Coil 73 may be directed towards low frequency current detection and measurement. Coil 73 may be used to measure the current provided to the load. As discussed in more detail below, the signals provided by coil 73 may be used to assess the presence of an arc fault, and further to classify an arc fault as a series or parallel arc fault. In certain embodiments, coil 73 may have a ratio of ~1000:1 turns about the line surrounded by the coil. For example, this may include 900-1100 turns. It may operate at a 50-60 Hz range and may be considered a low frequency coil.

Figure 1C:
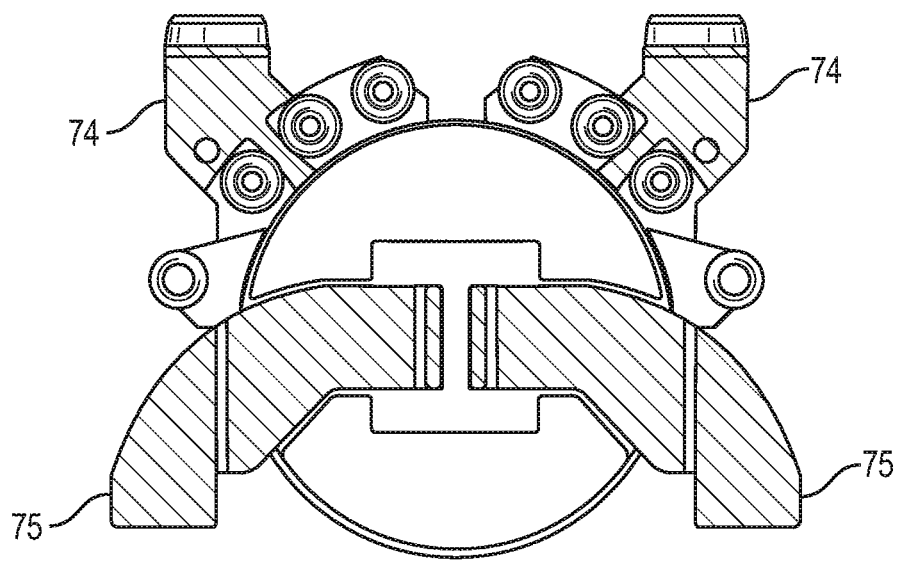
FIGS. 1C and 1D are bottom and side views, respectively, of the coil housing of FIGS. 1A and 1B, with coil assembly conductors, consistent with the present disclosure.
Figure 1D:
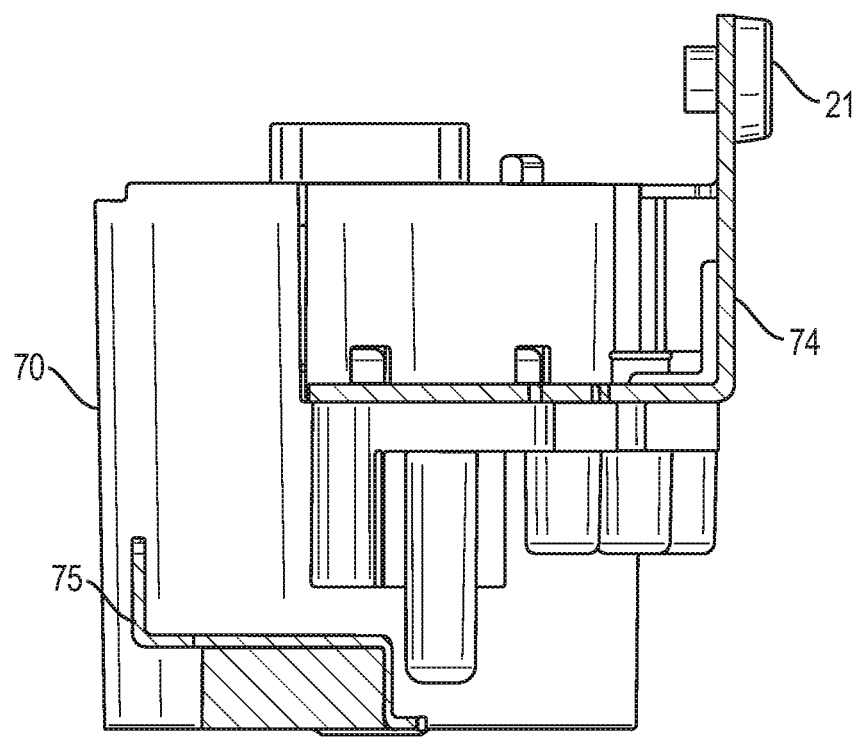

FIGS. 1C and 1D provide bottom and side views of coil housing 70, that further depict a pair of coil assembly output conductors 74 and a pair of coil assembly input conductors 75. Such coil assembly conductors may be considered part of the three-coil architecture. In certain embodiments, each coil assembly output conductor 74 may be fitted within an upper central recess 77, and each coil assembly input conductor 75 may be fitted within a lower central recess 78. In such fashion, each coil assembly input conductor 75 may be configured to conduct to a corresponding coil assembly output conductor 74 through corresponding central recesses 77, 78. In certain embodiments conductors 74 and 75 may be comprised of copper and may be disposed to securely fit within coil assembly 70. One set of coil assembly conductors 74, 75 may comprise a portion of the neutral line; the other set of coil assembly conductors 74,75 may comprise a portion of the live line. Each coil assembly output conductor 74 may terminate at an input static contact 21. Conductors 74 and 75 may be shaped as shown of FIGS. 1C-1D or may have other shapes suitable for inclusion within a particular HCI 400 configuration.

Figure 3:
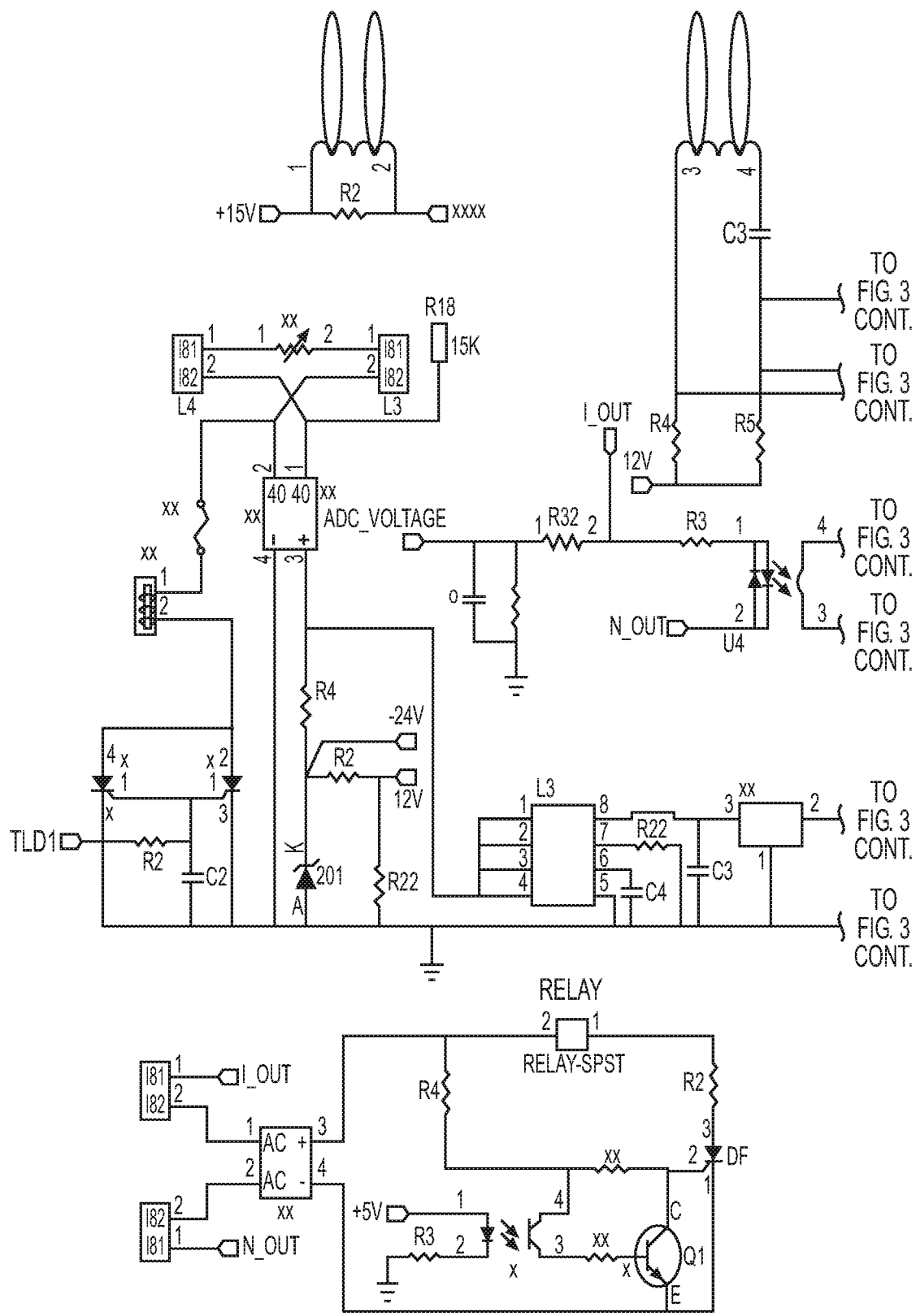
FIG. 3 depicts a circuit diagram of an embodiment of a hybrid circuit interrupter of the present disclosure.

FIG. 3 depicts an exemplary circuit schematic for HCI circuitry 300. Algorithms and various computing and decision processes discussed herein may preferably be accomplished by software programed on a microcontroller unit (MCU) of HCI circuitry 300 or the like. With respect to the embodiment shown in the schematic of FIG. 3, MCU is embodied as element U2 and may be a STM32F030 microcontroller manufactured by STMicroelectronics or other suitable processor.

Via coils 71 and 72 and associated leakage signal circuitry, HCI circuitry 300 may provide MCU a leakage signal indicative of current imbalance on the neutral and live lines (at GFI_FAULT). Such an imbalance may indicate the potential existence of a leakage current, and perhaps, a ground fault condition. When the leakage signal indicates a current imbalance above a certain threshold, for example, approximately 5-6 mA, MCU may determine that a ground fault is occurring.

Via coil 73 at its circuitry, HCI circuitry 300 may also provide an RMS voltage signature (at MCU_V_ADC), which may be used to determine the presence and/or classification of an arc fault.

Via coil 73 at its circuitry, HCI circuitry 300 may also provide an RMS current signature (at I_RECT), which may be used to determine the presence and/or classification of an arc fault.

Via coil 73 at its circuitry, HCI circuitry 300 may also provide, at I_ZC, a rectangular waveform derived from the RMS current single-sided current waveform (I_RECT). The signal at I_ZC may be understood to include both a time domain signature and a pulse signature, and may be used to determine the presence and/or classification of an arc fault.

Consistent with this disclosure, the respective signals may be processed and analyzed by the MCU to determine the presence of and/or classify a various electrical fault. Subsequent to such determination or clarification, MCU may, as appropriate, engage mechanisms to halt the supply of power, and place HCI 400 in a permanent or semi-permanent non-working (e.g., tripped) state. MCU may, in some embodiments, accomplish the functions described herein by executing a computer program stored on a non-transitory computer readable storage medium. Such computer readable storage medium may be included within MCU, external to MCU, or partially within and partially external to MCU. In alternative embodiments, a single IC may provide the functionality of MCU and additional elements of HCI circuitry 300.

When appropriate, for example, when a ground or arc fault is detected, MCU may provide a trip signal, for example, via TRIG1, as depicted in FIG. 3, to at least temporarily remove power provided to the relay T1 of FIG. 3 and thereby trip the HCI device 400 via mechanisms discussed below. This may place the HCI in a tripped condition, whereby the supply of power through HCI 400 is halted.

If appropriate, HCI circuitry 300, may also provide a locking signal at TRIG (pin 14) of MCU to reset blocking coil assembly 19 and put a tripped HCI device 400 in a locked state. In such a locked state, HCI 400 is mechanically prevented from resetting. The locked state may be an EOL state in some circumstances. That is, MCU may be programmed to, upon the occurrence of certain events, permanently disable its capability to take HCI device 400 out of a locked state and back into an unlocked state. In this manner, HCI 400 may achieve an EOL state whereby it permanently remains in a locked, tripped state.

Figure 4:
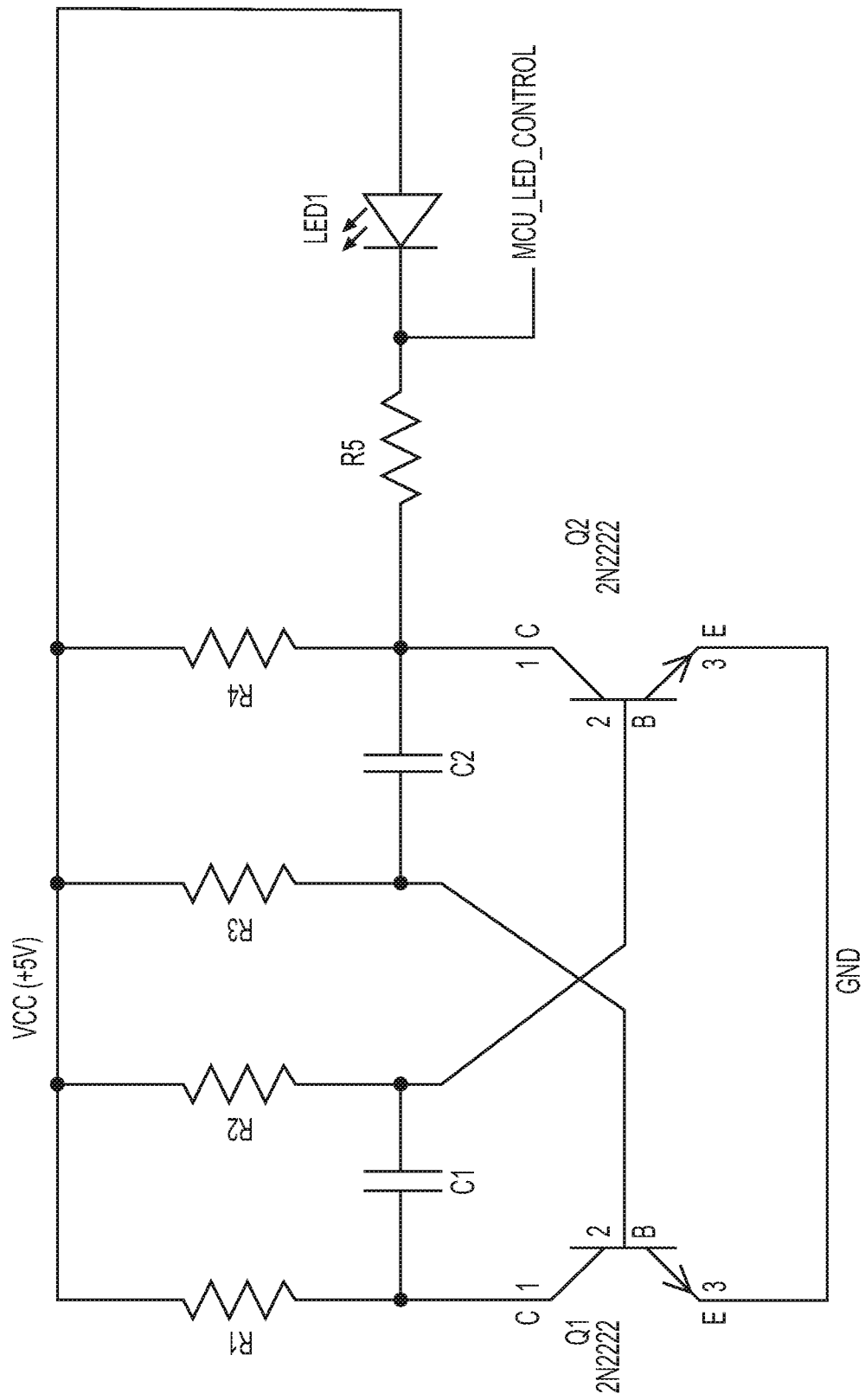
FIG. 4 depicts a circuit diagram of an embodiment of a failsafe circuit for a hybrid circuit interrupter, consistent with the present disclosure.

In some embodiments, HCI 400 may include additional fail-safes to prevent HCI from providing power operation if MCU suffers a malfunction. Because the electrical fault detection and self-testing described herein may only be reliable with a properly functioning MCU, it may be advantageous for HCI 400 to detect an MCU malfunction, and cease providing power and/or notify a user of the malfunction in response. To accomplish this, HCI circuitry 300 may include a failsafe circuit that would, as a default, maintain HCI 400 in a tripped state and/or provide a continuous alert signal. FIG. 4 illustrates an exemplary embodiment of such a failsafe circuit. The alert signal may, for example, cause a red LED of the HCI 400, e.g., D1 in FIG. 3, to blink indefinitely when an MCU failure is detected. MCU may be further programmed to provide a proper operation signal when it is functioning, for example at pin 7, which is the red LED to prevent such blinking. When the MCU provides the failsafe signal, the failsafe circuit will not be able to provide the continuous alert.

Figure 5A:
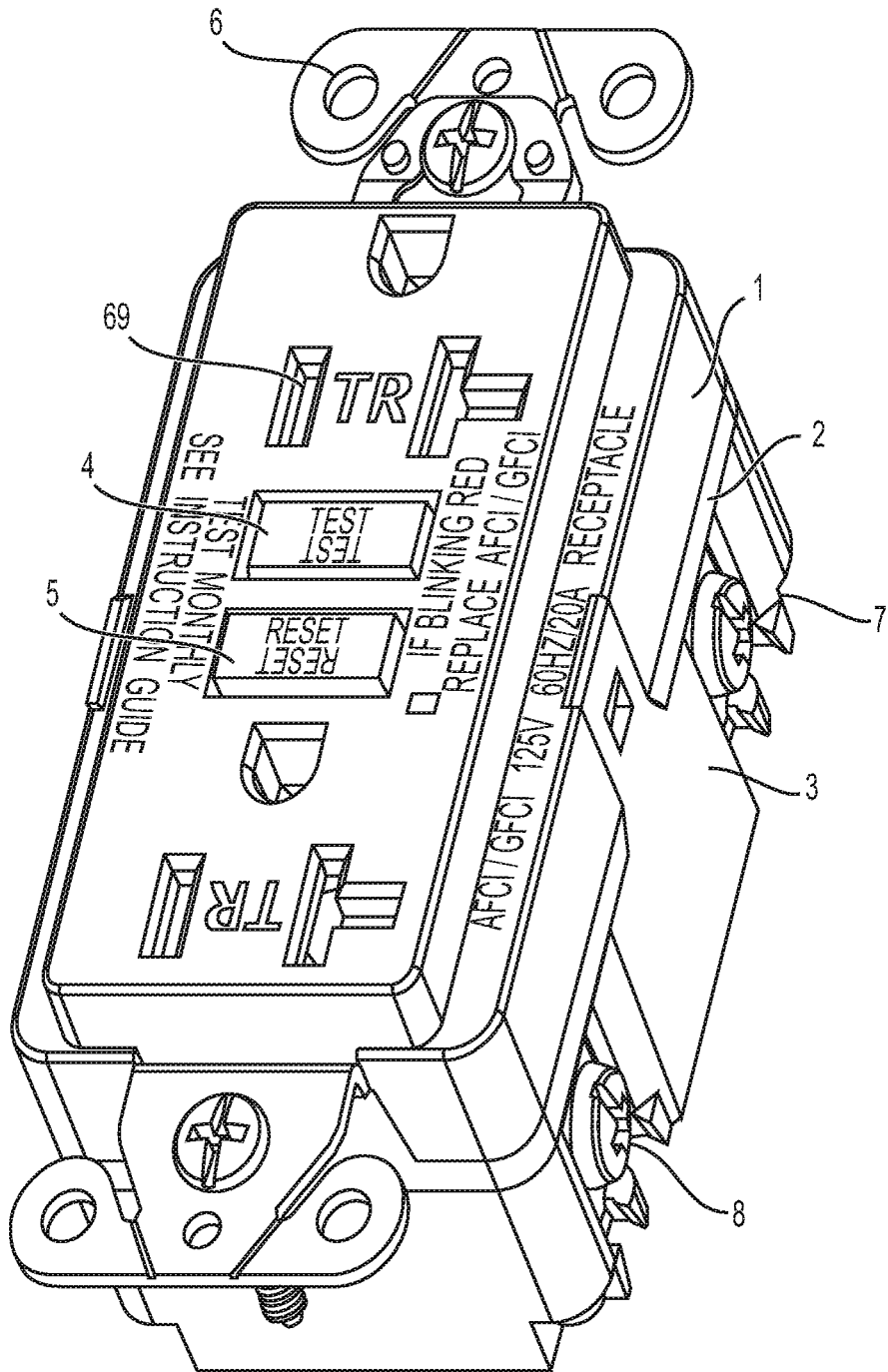
FIGS. 5A-5E are external views of an embodiment of a hybrid circuit interrupter, consistent with the present disclosure.
Figure 5B:
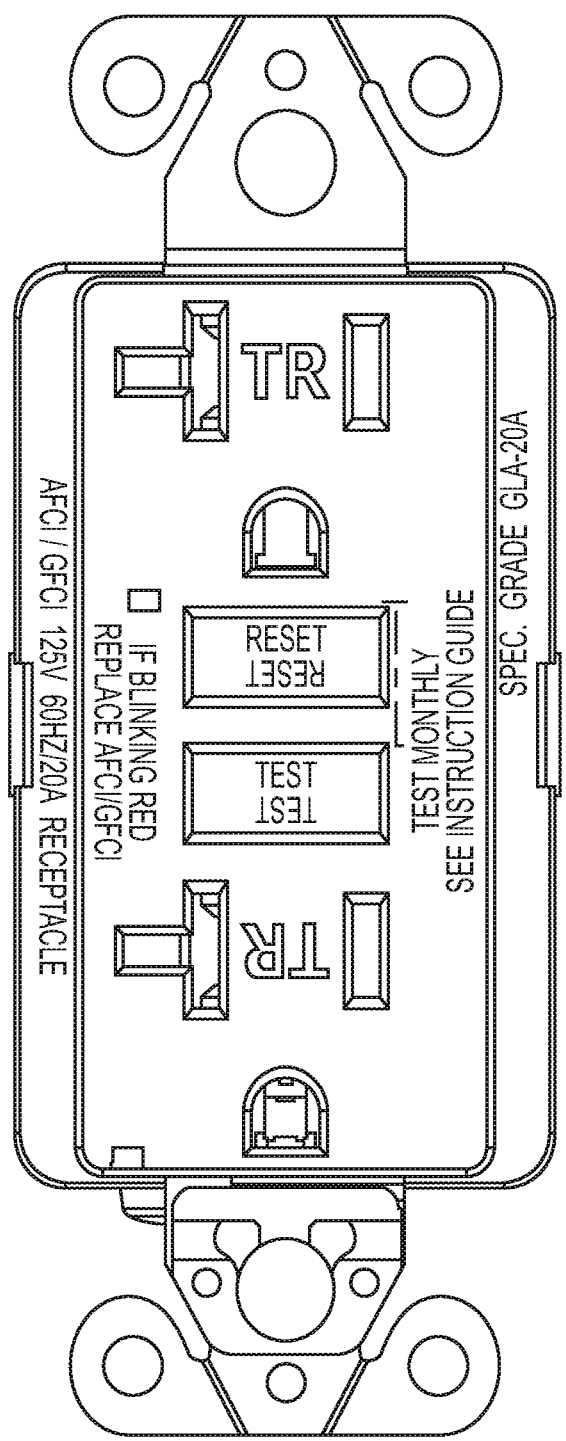
Figure 5C:
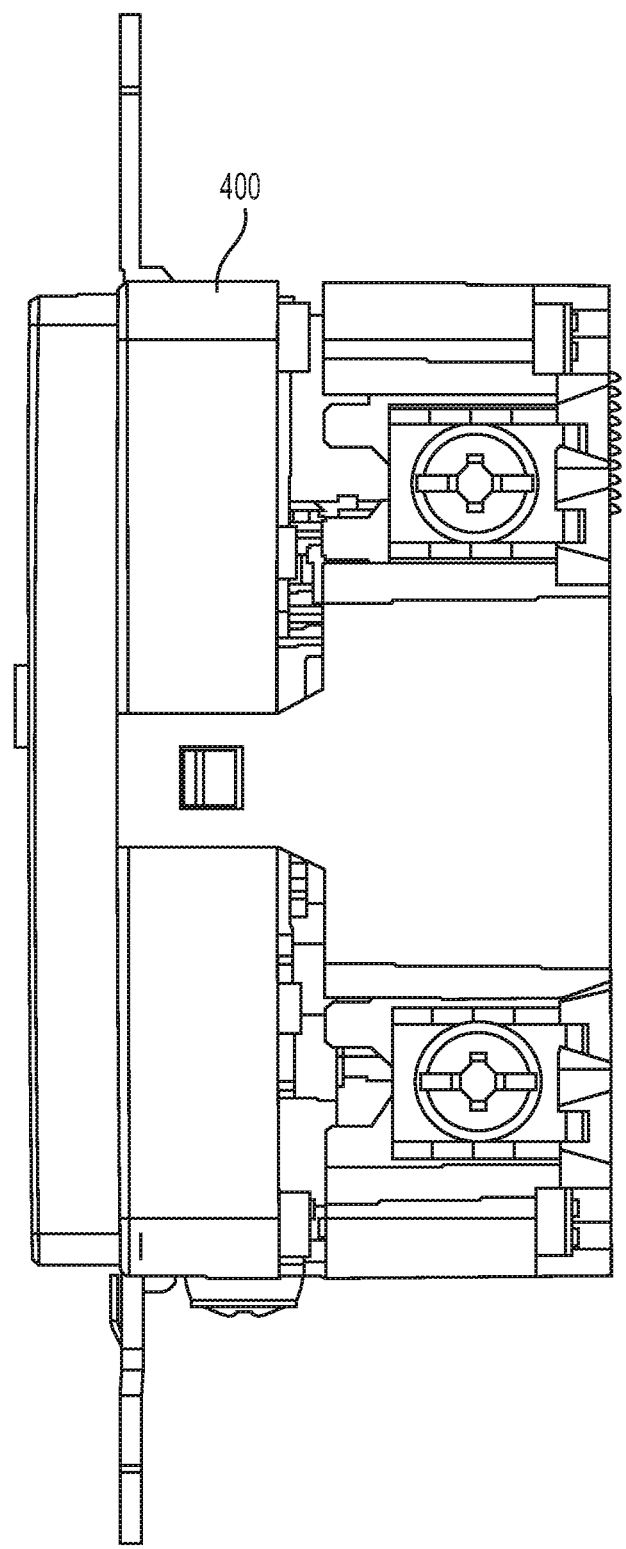
Figure 5D:
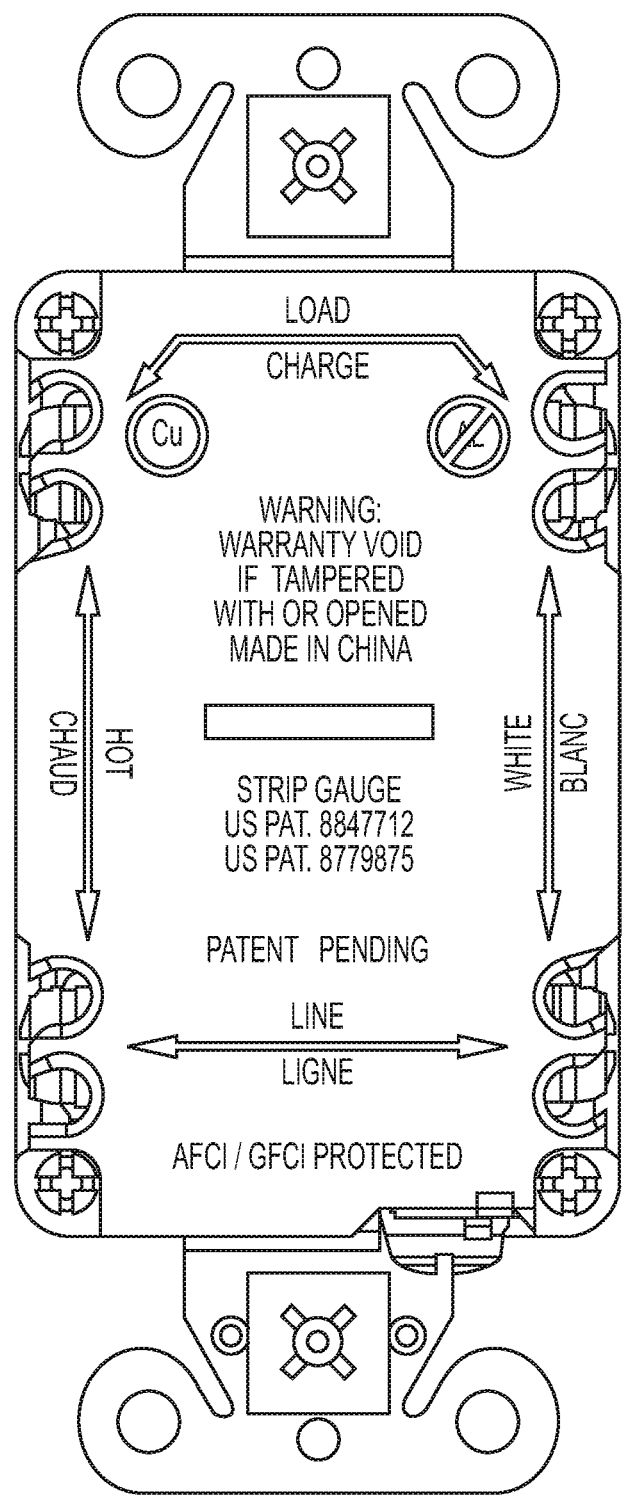
Figure 5E:
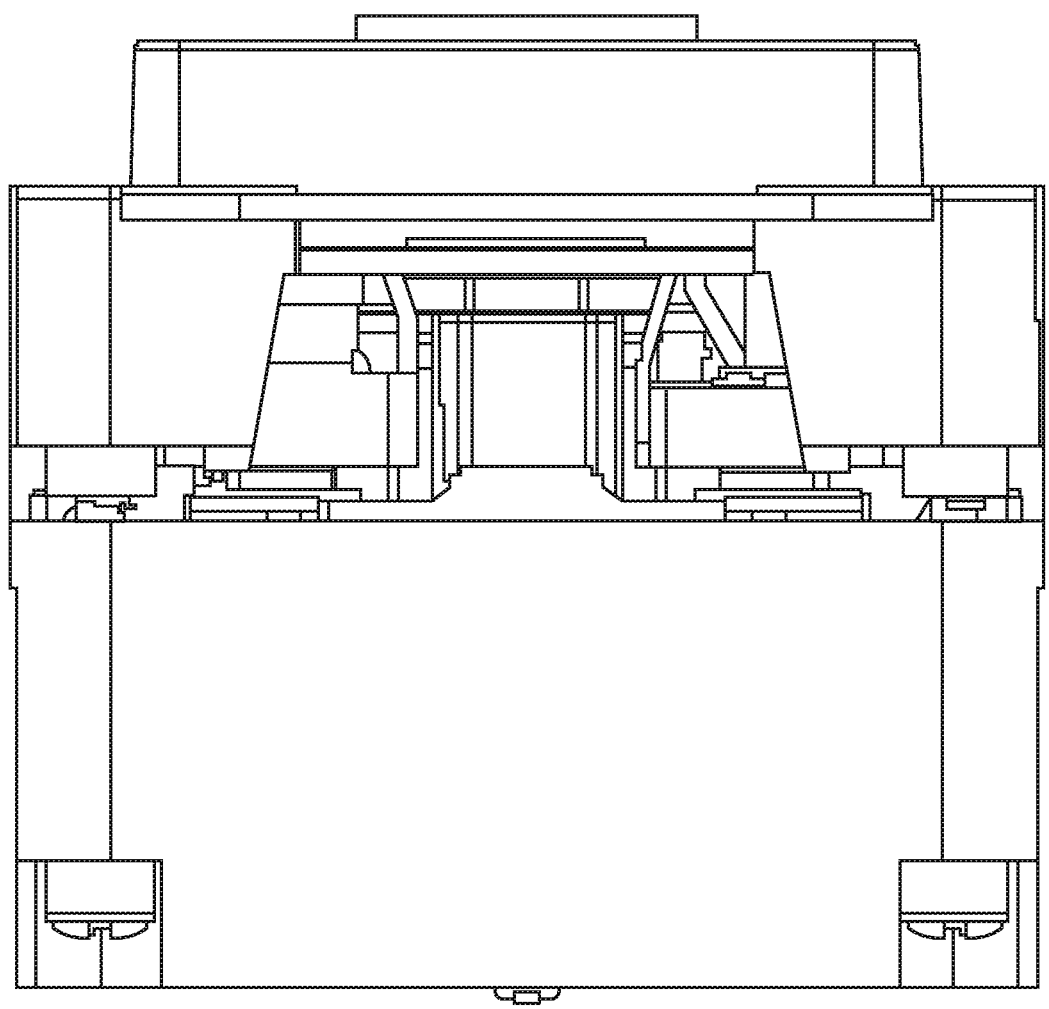
Figure 5F:
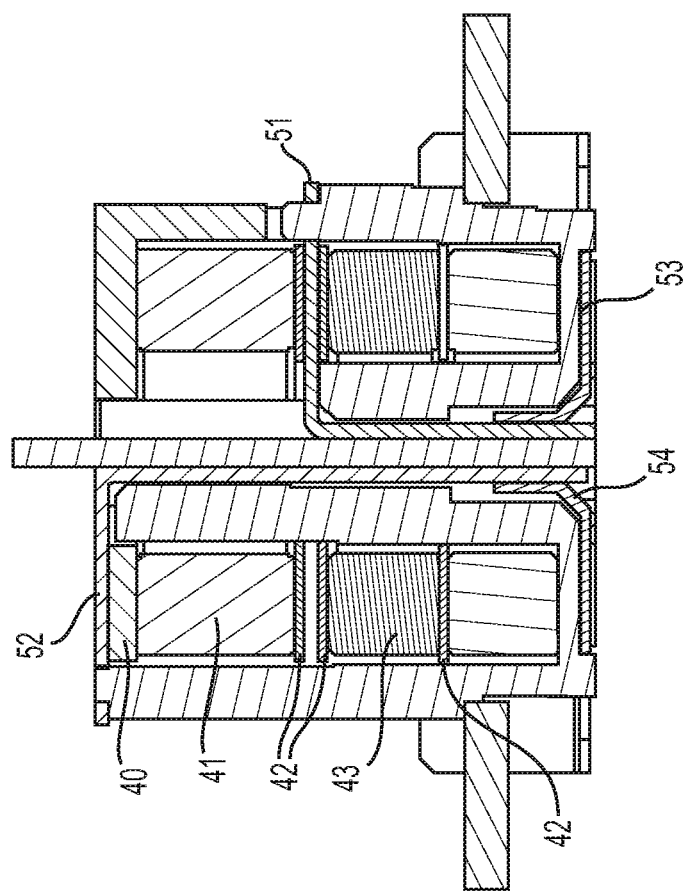
FIGS. 5F-5H are internal side, exploded internal, and external side views, respectively, of an embodiment of a hybrid circuit interrupter, consistent with the present disclosure.
Figure 5G:
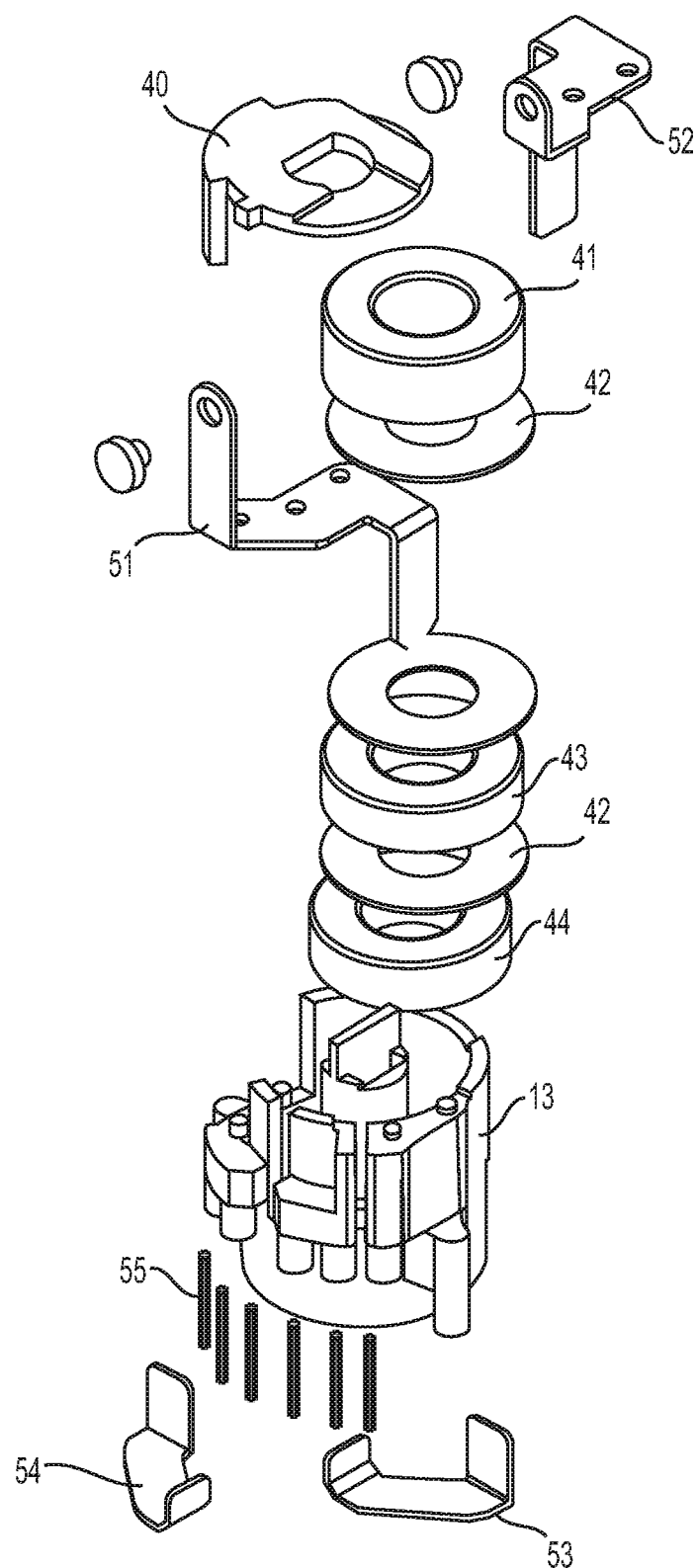
Figure 5H:
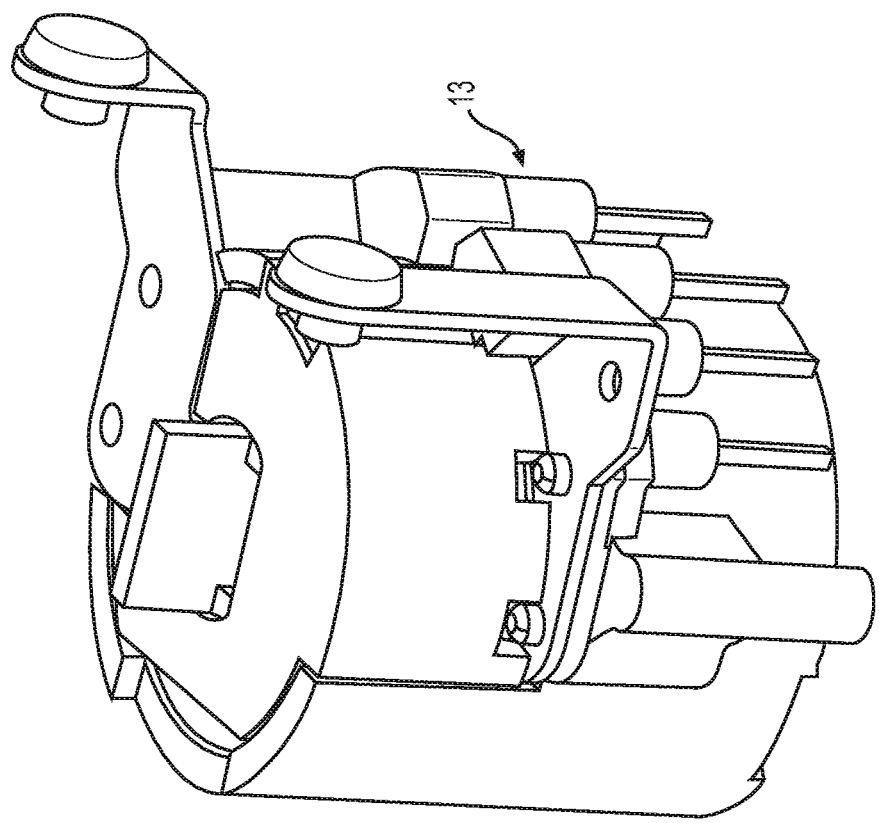
Figure 5I:
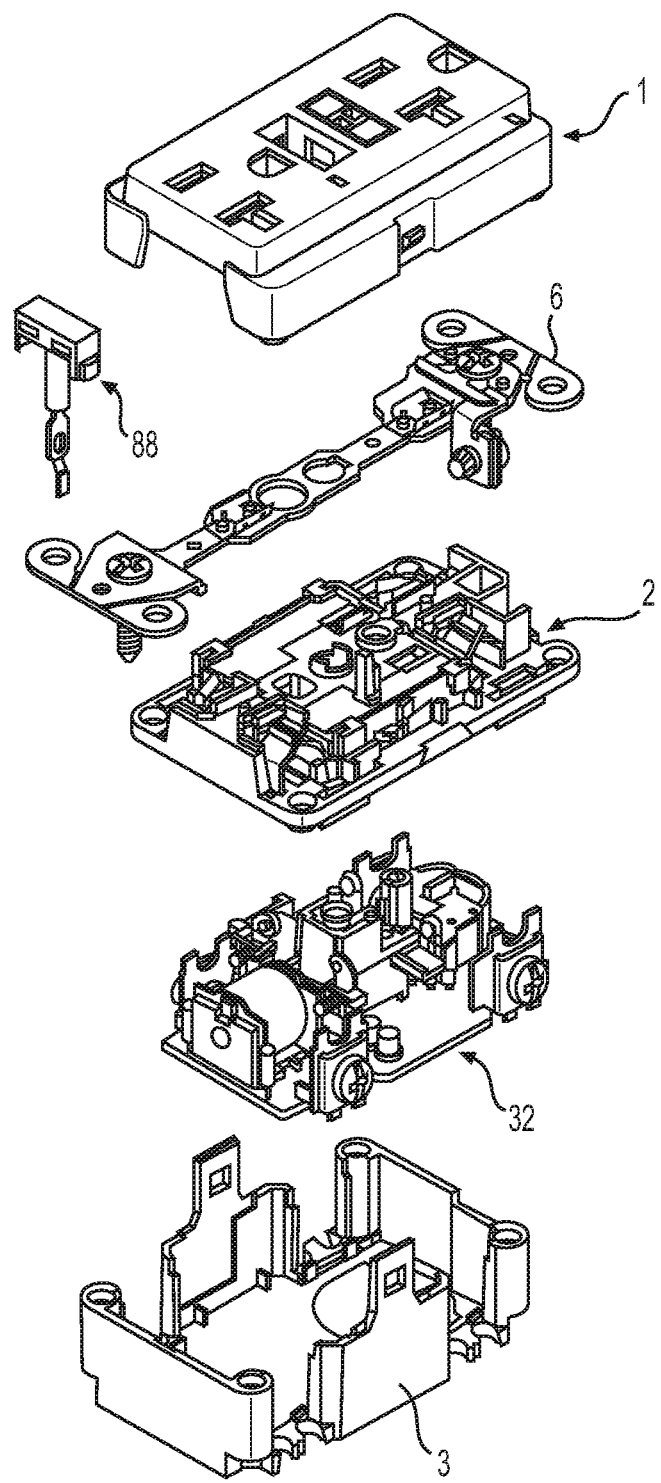
FIG. 5I is a schematic assembly diagram of an embodiment of the current invention.
Figure 5J:
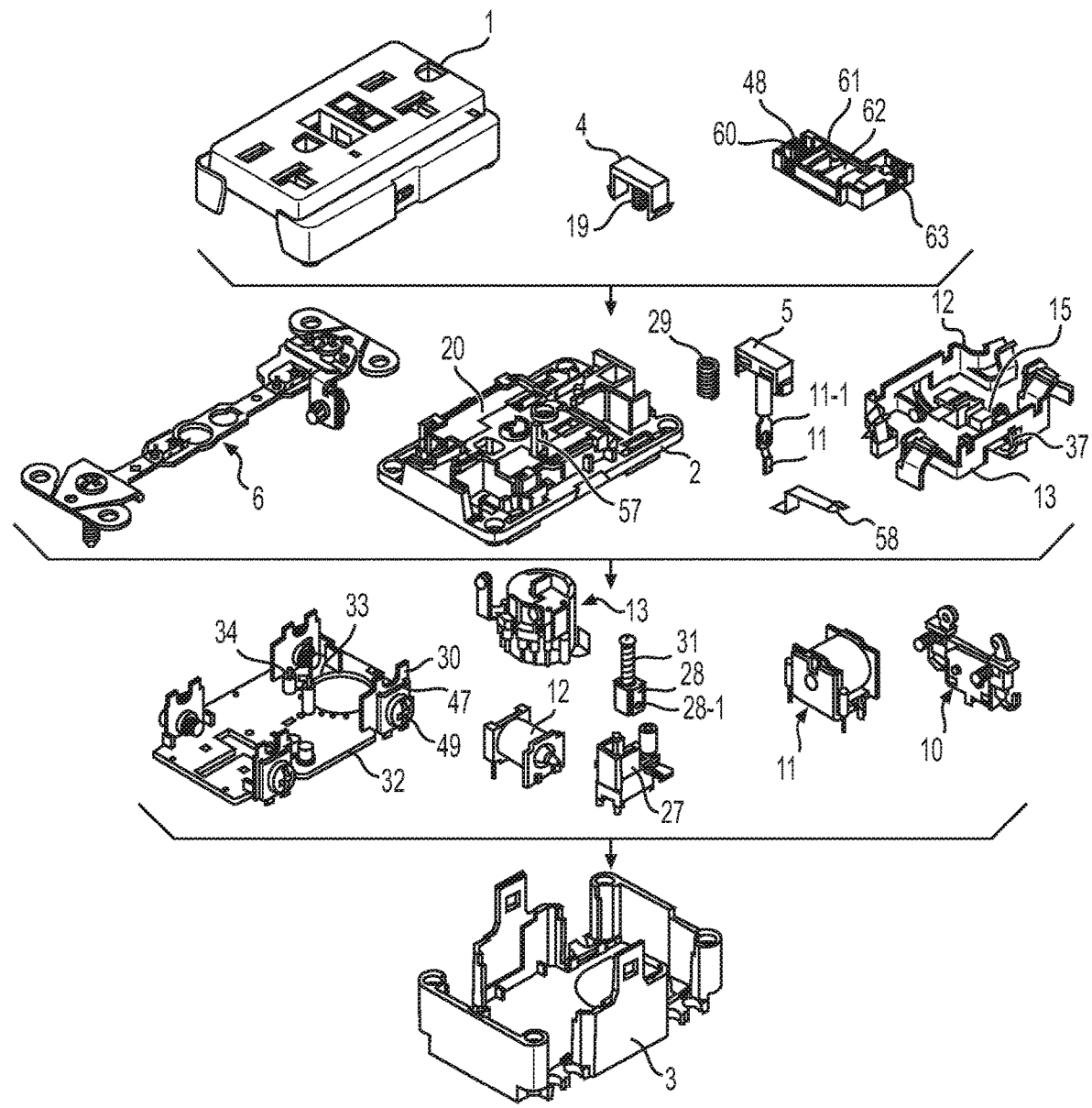
FIG. 5J is an exploded view of an embodiment the current invention.
Figure 5K:
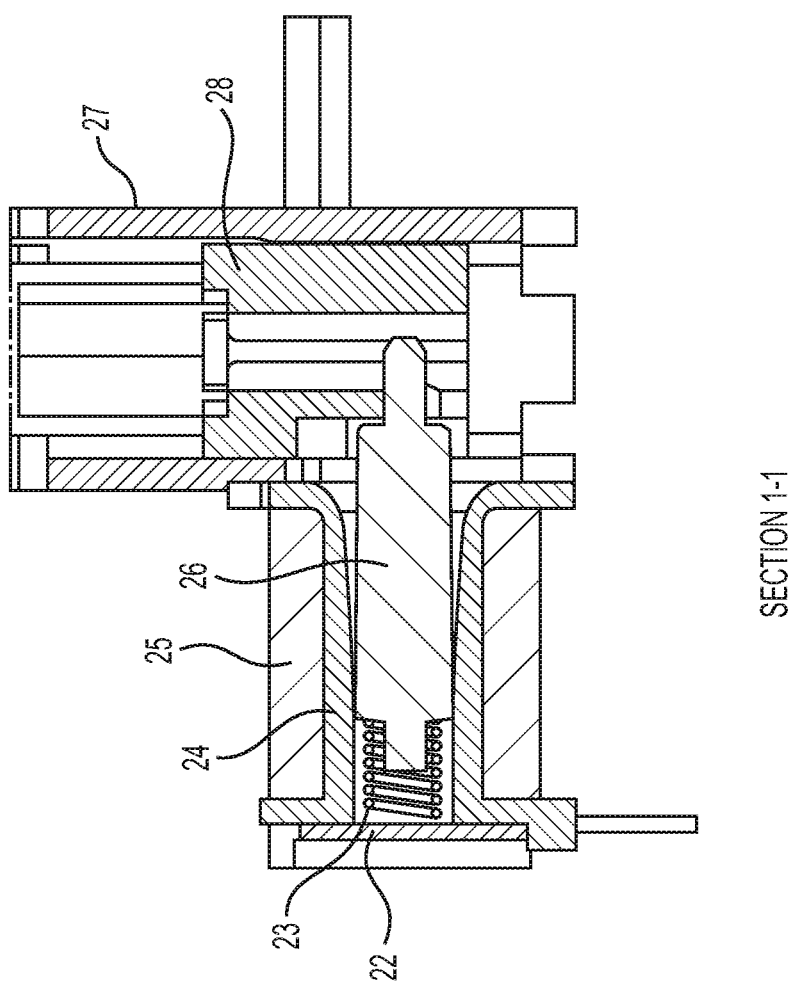
FIGS. 5K, 5L, and 5M are three-directional view drawings of certain parts of the trip coil component of an embodiment of the current invention.
Figure 5L:
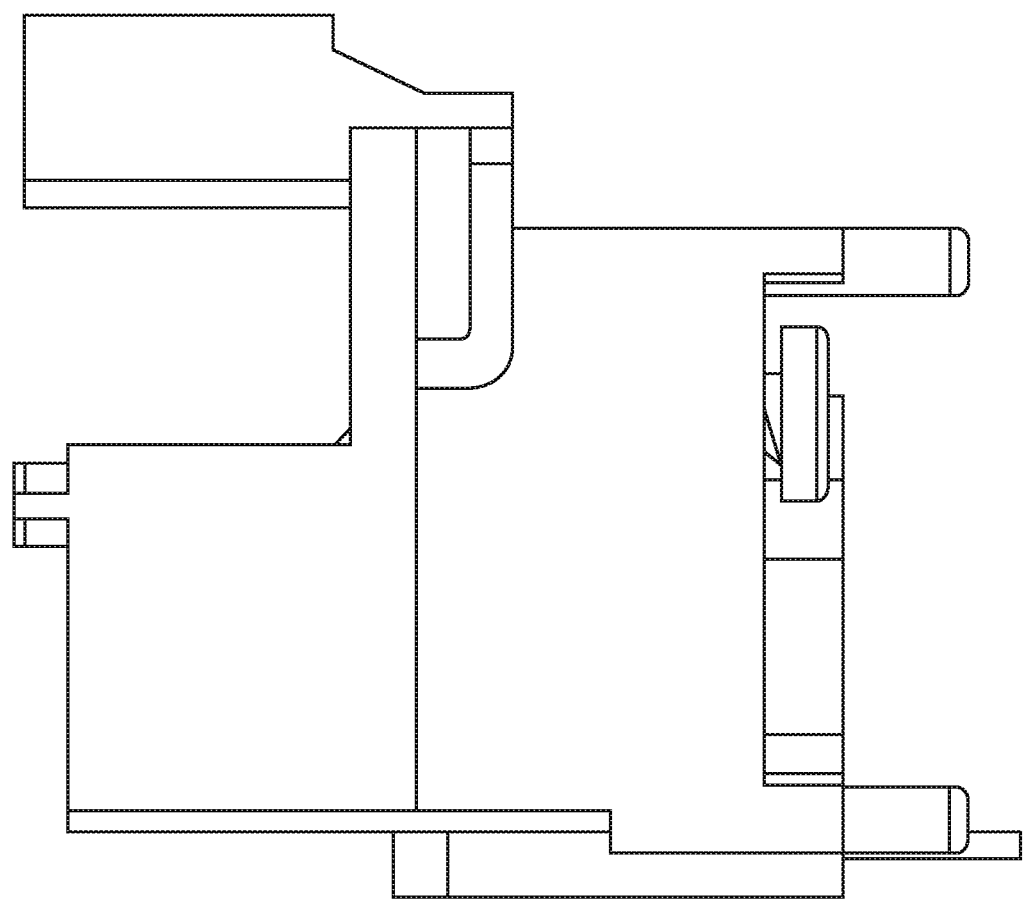
Figure 5M:
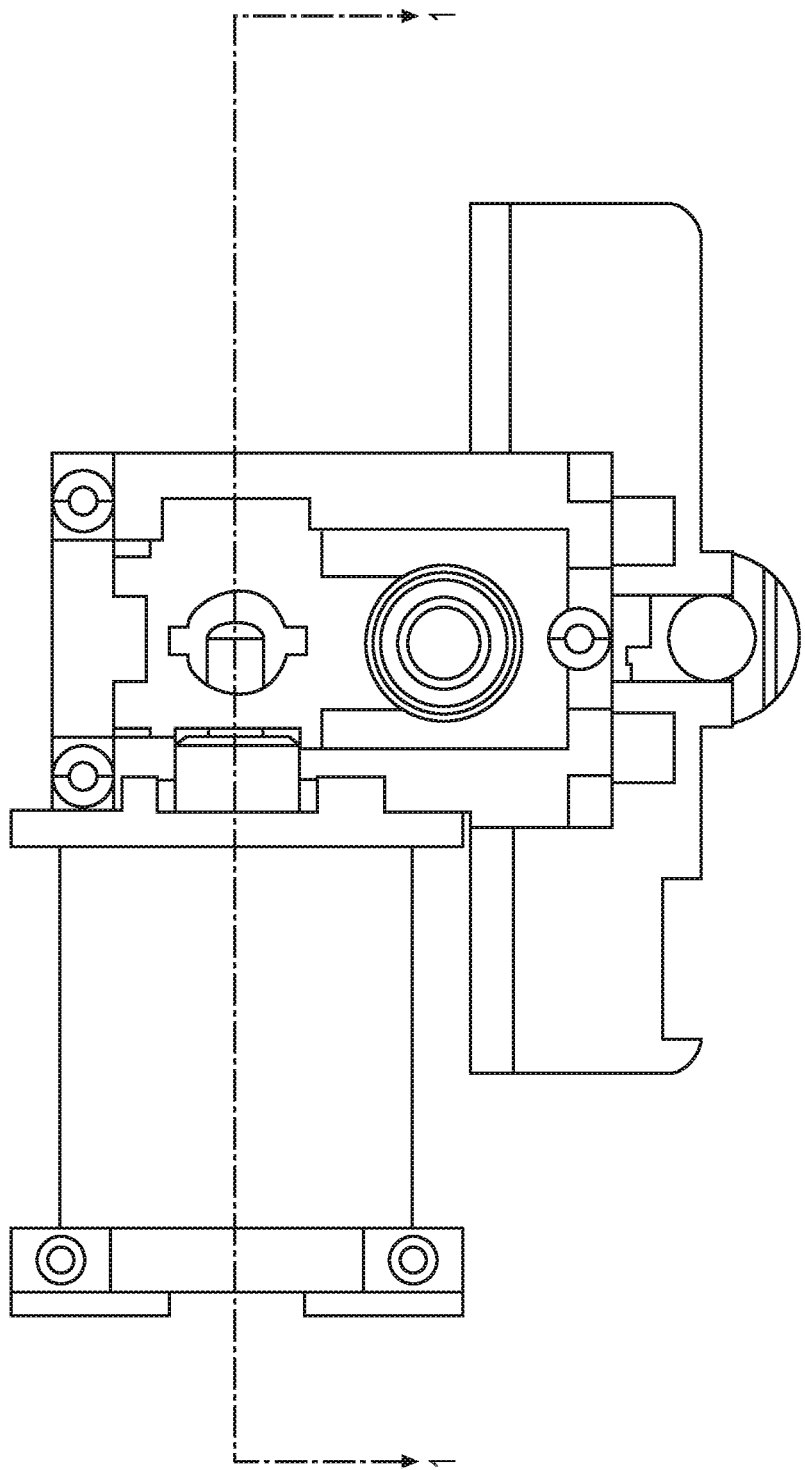
Figure 5N:
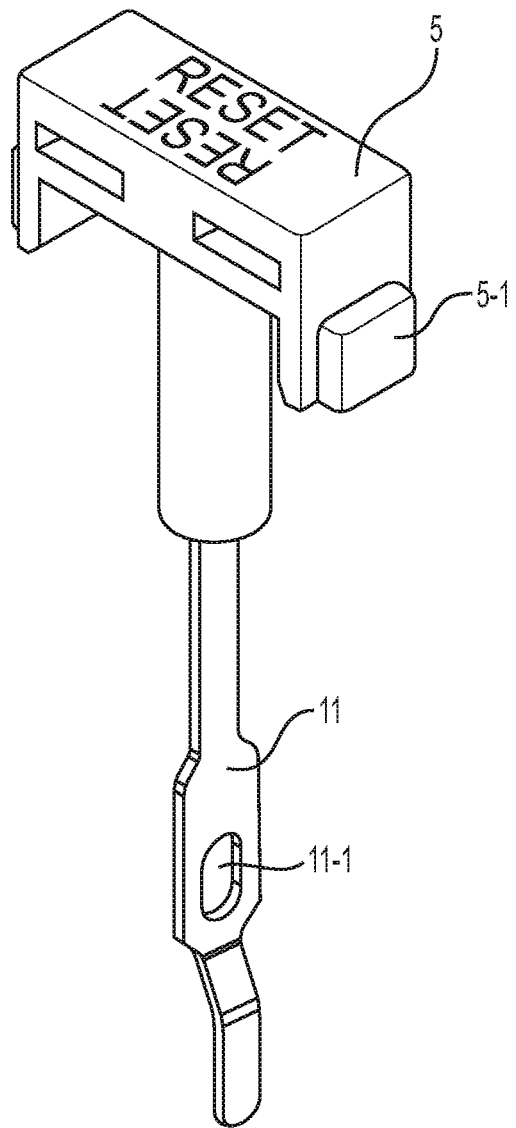
FIG. 5N is a structural diagram of a reset button structure in an embodiment of the current invention.
Figure 50:
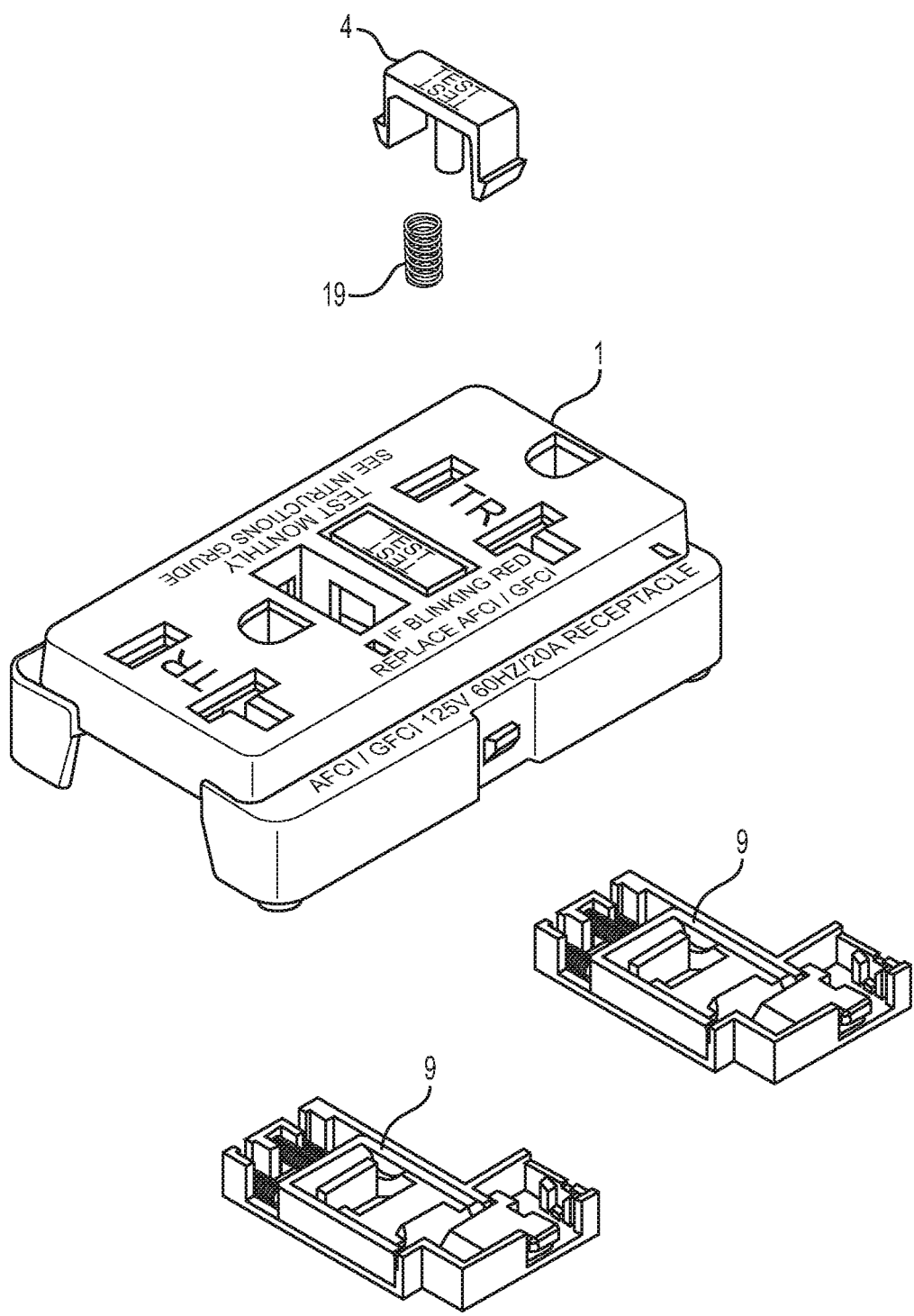
Figure 5P:
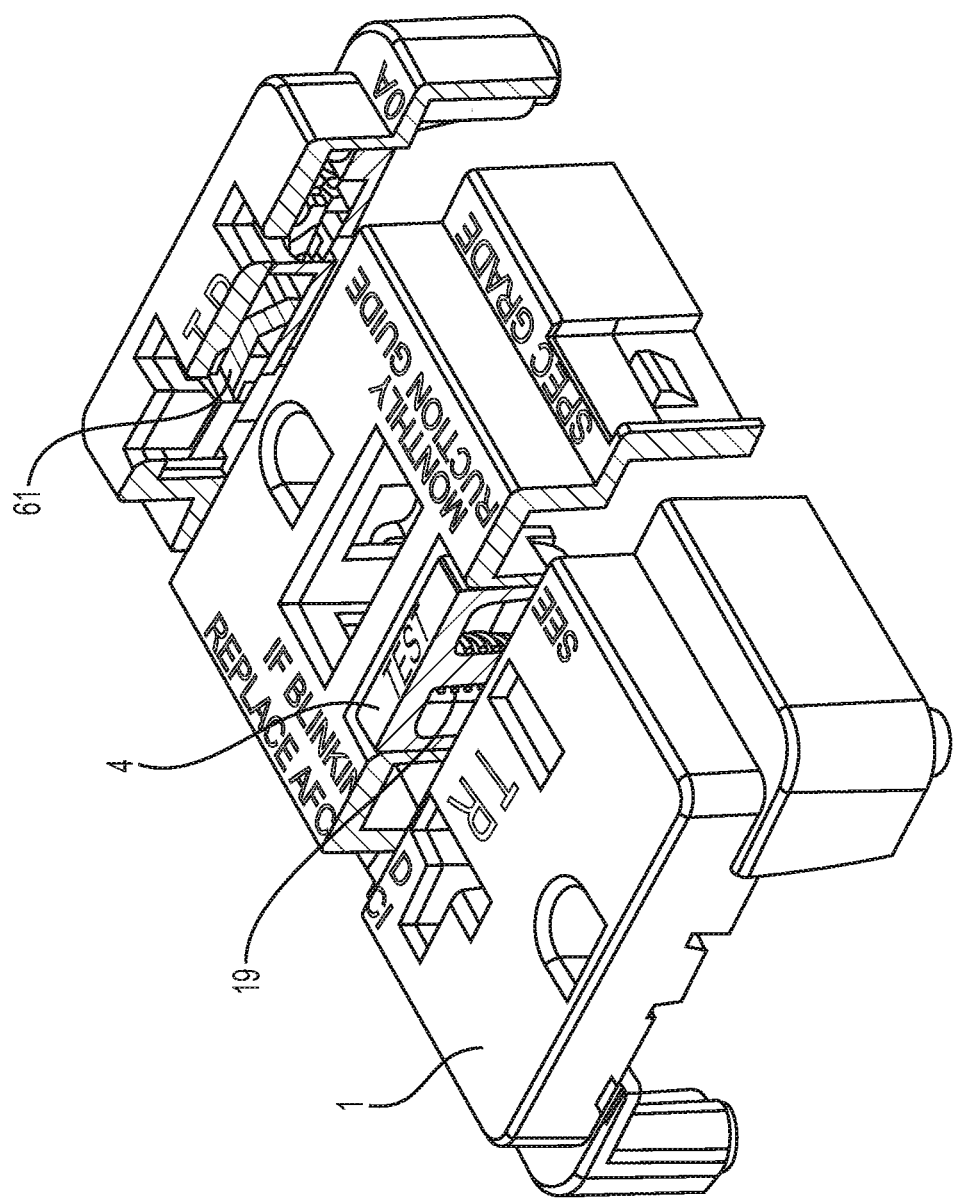
FIG. 5P is a structure diagram of the assembled upper cover component of an embodiment of the current invention.
Figure 5Q:
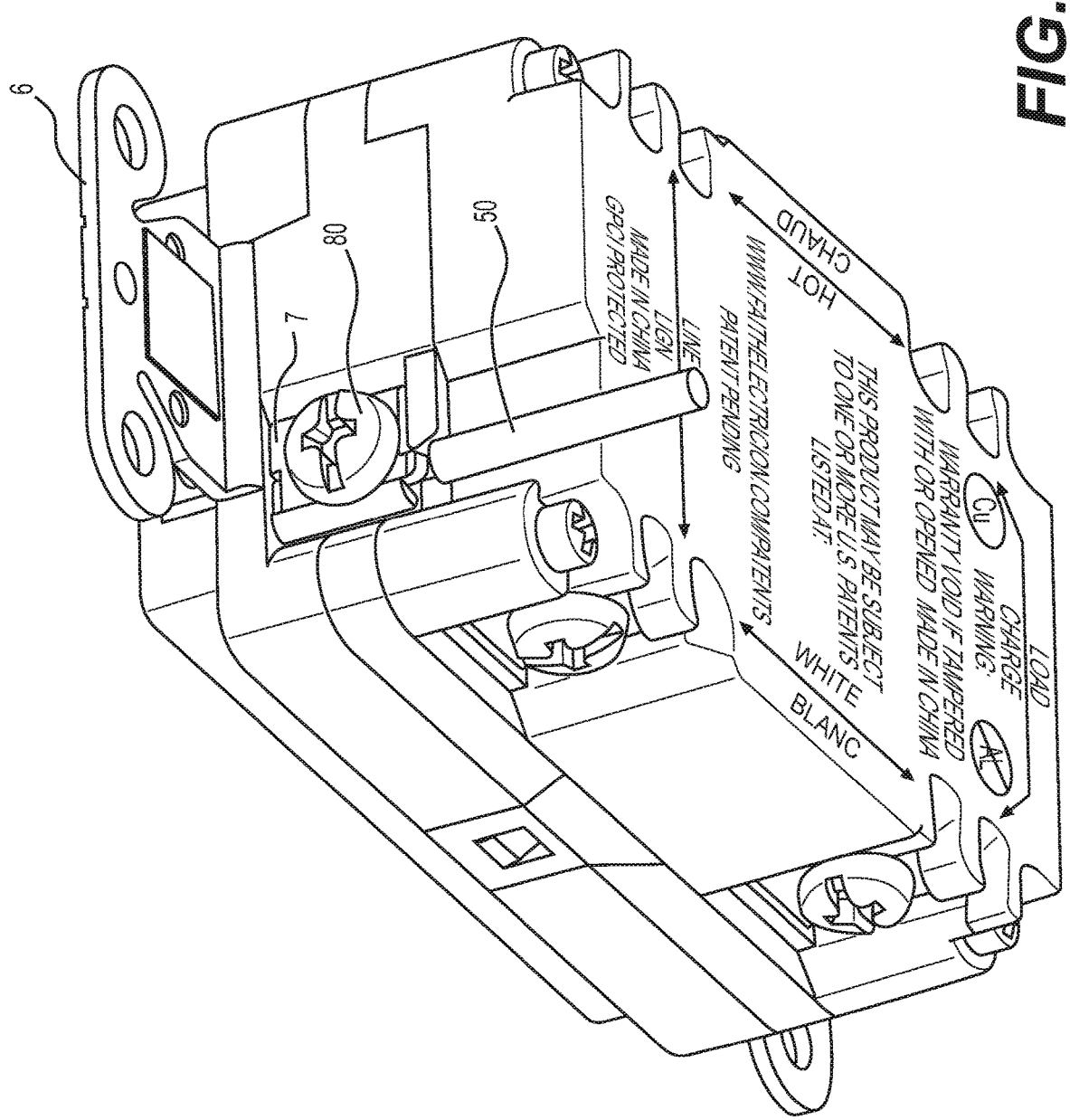
FIG. 5Q is structure diagram of a ground wire of an embodiment of the current invention.

With reference to FIGS. 5A-5Q, the physical structure and mechanisms of an embodiment of HCI outlet 400 containing HCI circuitry 300 is discussed. Although HCI outlet 400 is discussed in detail as an example, HCI circuitry 300 and other technologies disclosed herein may be adapted for use in HCI circuit breakers in other forms and configurations, as would be understood by persons of skill in the art.

With reference to FIG. 5A, which is a perspective view of an uninstalled HCI outlet 400, the outlet may comprise face casing 1, middle frame 2, bottom casing 3 that may further comprise a side key component, output connector assembly 8, input connector assembly 7 to connect to the input line, and ground iron piece 6 to be grounded. Face casing 1 may provide access to electrical jacks 69, reset button 5, and test button 4. FIGS. 5B-5E provide additional views of uninstalled HCI outlet 400. FIGS. 5F, 5G, and 5H are longitudinal sectional views of a the three detection electromagnetic rings according to an embodiment of the present disclosure (a power input component 13 is composed of a current detection magnetic ring 41, an electric leakage detection magnetic ring 43, a grounding detection magnetic ring 44, a mylar 42, a power input static piece 51, a power input static piece 52, a power input connection strap 53, a power input connection strap 54, a power input connection pin 55, a magnetic ring base 45, and a magnetic ring cover 40. Three magnetic rings and three mylars and the magnetic ring static piece 51 are designed in a superposition manner, which solves the problem of increasing and saving space).

FIG. 5I provides an exploded view of HCI outlet 400, which depicts face casing 1, mainboard assembly 32, which is disposed between and is substantially enclosed by middle frame 2, reset button assembly 88, iron grounding component 6, and bottom casing 3.

FIG. 5J provides a further exploded view of HCI outlet 400. As depicted, between an upper cover 1 and a bottom case 3 are contained middle frame 2, which may comprise an indicator-lamp cover 57 and a safety door 49, the iron grounding component 6, a relay movable piece component 10, a trip coil component 12, an electromagnetic transducer component 13, a middle frame 2, a test button 4, a reset button 5, a safety door cover 60, a slide 63, a safety door outer slide 61, a safety door inner slide 62, a reset button stainless steel sheet 11, a reset button stainless steel sheet hole 11-1, a 15 A static piece 12, a 20 A static piece 13, a slider 15, a test button spring 19, a dust board 20, a slide carriage 27, a reset slide 28, a reset slide hole 28-1, a reset button spring 29, a universal fixed splint 30, a slide reset spring 31, a printed circuit board assembly (PCBA, or main board) 32, a reset detection ground resistor 33, a self-detection resistor 34, an oxygen-free soft glue wire 37, a universal movable splint 47, a safety door spring 48, a screw 80, and a bridge test strip 58.

FIGS. 5K-5M provide additional detail of trip coil assembly 18 via cross-sectional side, back, and bottom views respectively. Trip coil assembly 18 may include a spring stopper 22, a trip coil spring 23, a trip coil frame 24, a trip coil 25, a trip coil iron core 26, the slide carriage 27, and the slide 28, according to an embodiment of the present disclosure.

FIG. 5N provides additional detail of reset button assembly 88 via a perspective view. Reset button assembly 88 may comprise the reset button 5, a reset button snap 5-1, the reset button stainless steel sheet 11, and the reset button stainless steel sheet hole 11-1.

FIG. 5O depicts a perspective exploded view of the upper cover component, comprising the test button 4, the test button spring 19, the upper cover 1, and the safety door component 61. FIG. 5P depicts the assembled view of the elements depicted in FIG. 5O, that further includes cross sections to illustrate the assembly.

FIG. 5Q is a diagram of a ground wire of the embodiment of HCI outlet 400 connected to a grounding line 50, the screw 80, the iron grounding component 6, and a ground wire 50. Dual purpose clamp 52 may serve to both provide a ground point and clamp the ground wire during installation.

With reference to FIGS. 6A-6J, 7A-E, and 8-9, certain operations of an embodiment of HCI 400 are described.

Figure 6A:
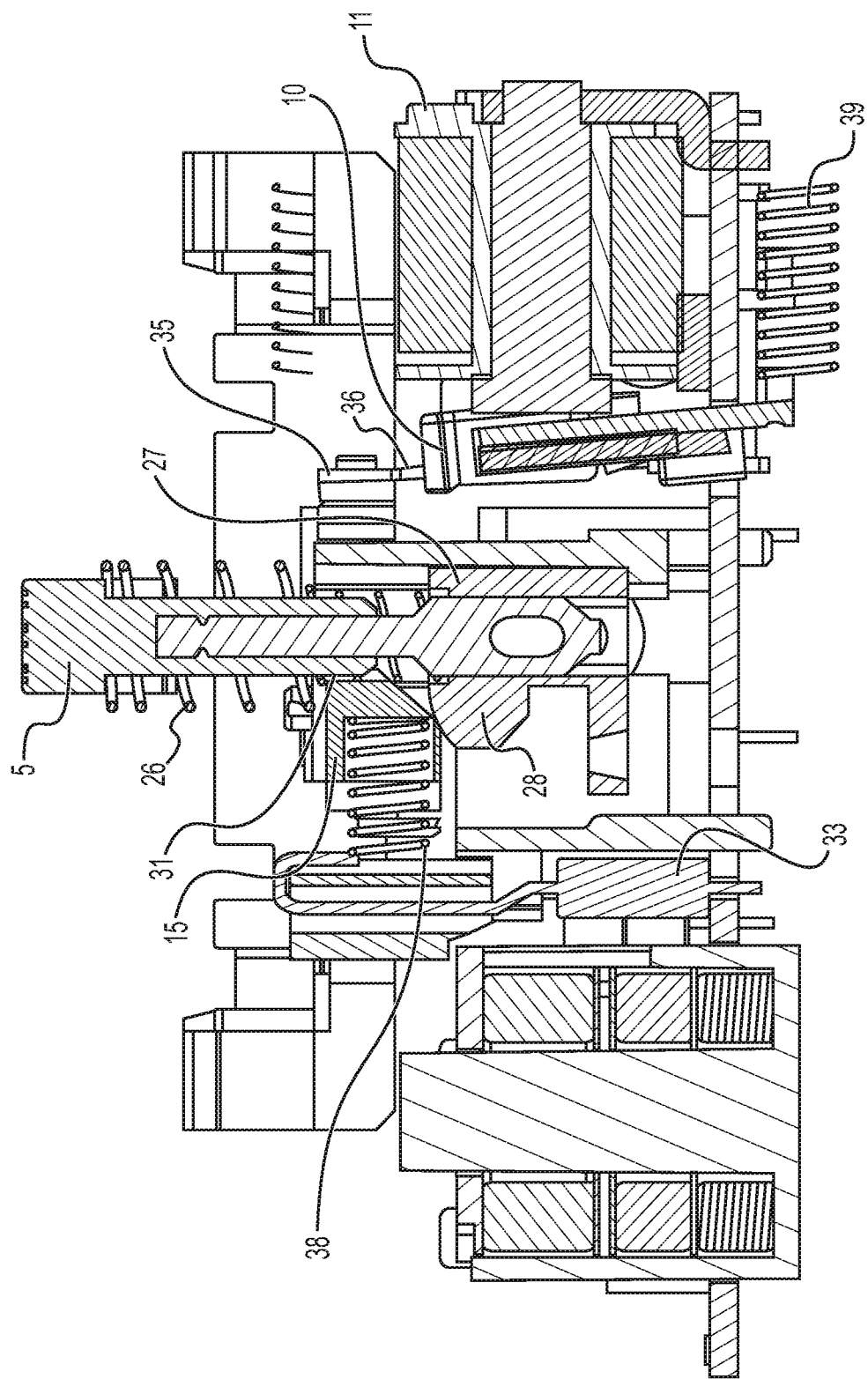
FIGS. 6A and 6B are each longitudinal sectional views of a tripping state according to an embodiment of the present disclosure.

FIG. 6A shows an embodiment of the present disclosure in a tripping state; specifically, reset button 5, slider 15, trip coil iron core 26, slide carriage 27, slide 28, slide reset spring 31, slider spring 38, relay movable piece component 10, relay component 11, test resistor 33, relay tension spring 39, relay movable piece 36, and relay movable piece contact 35.

Figure 6B:
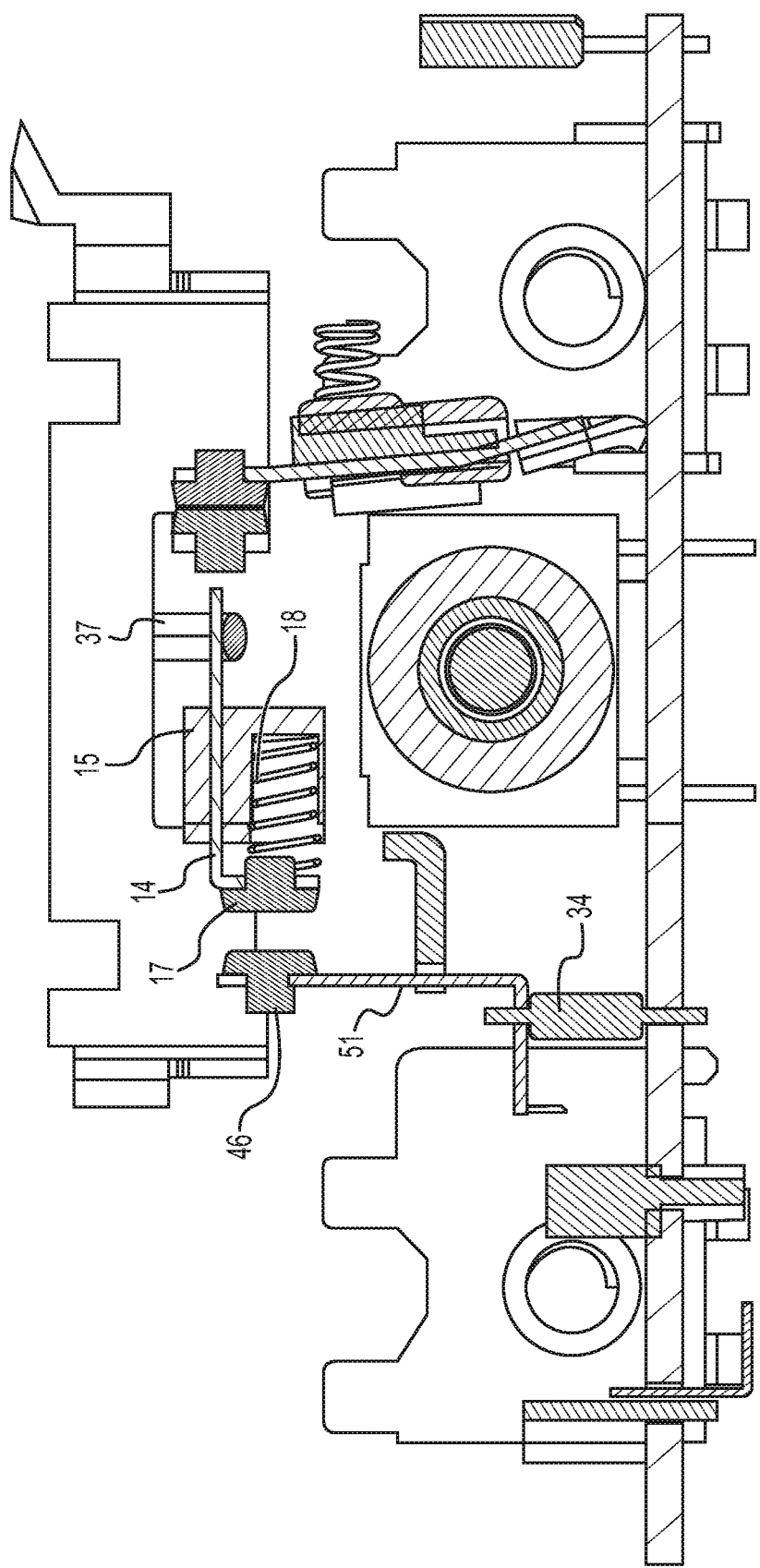

FIG. 6B shows an embodiment of the present disclosure in a tripping state. Specifically, slider movable contact piece 14, slider 15, slider movable contact piece silver contact 17, slider movable contact spring 18, self-detection resistor 34, oxygen-free soft glue wire 37, magnetic ring cover static piece contact 46, and power input static piece 51.

Figure 6C:
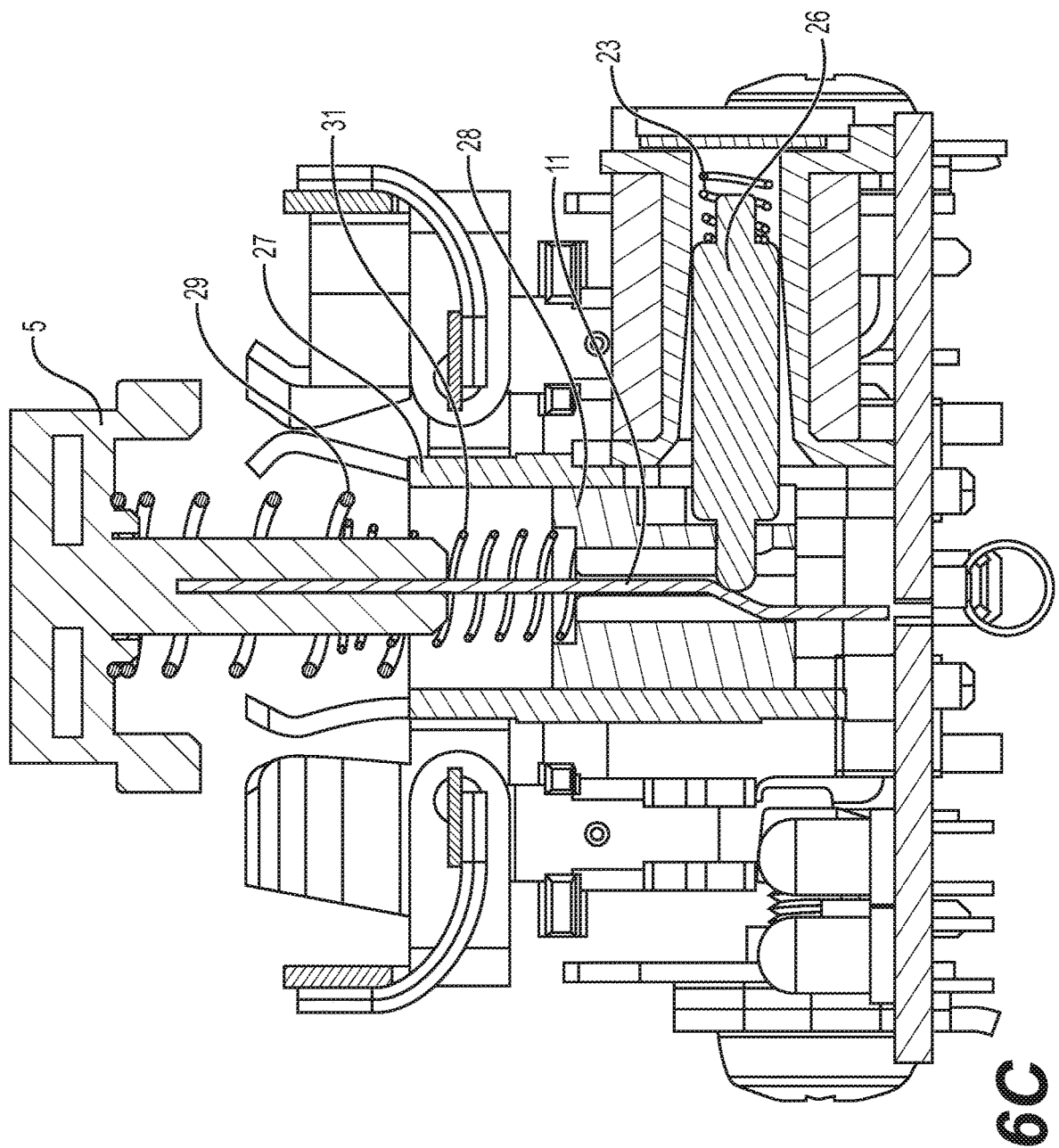
FIG. 6C is a transverse sectional view of a tripping state according to an embodiment of the present disclosure.

FIG. 6C shows a tripping state according to an embodiment of the present disclosure. Specifically, reset button 5, reset button stainless steel sheet 11, trip coil spring 23, trip coil iron core 26, reset slide carriage 27, reset slide 28, slide reset spring 31, and reset button spring 29.

Figure 6D:
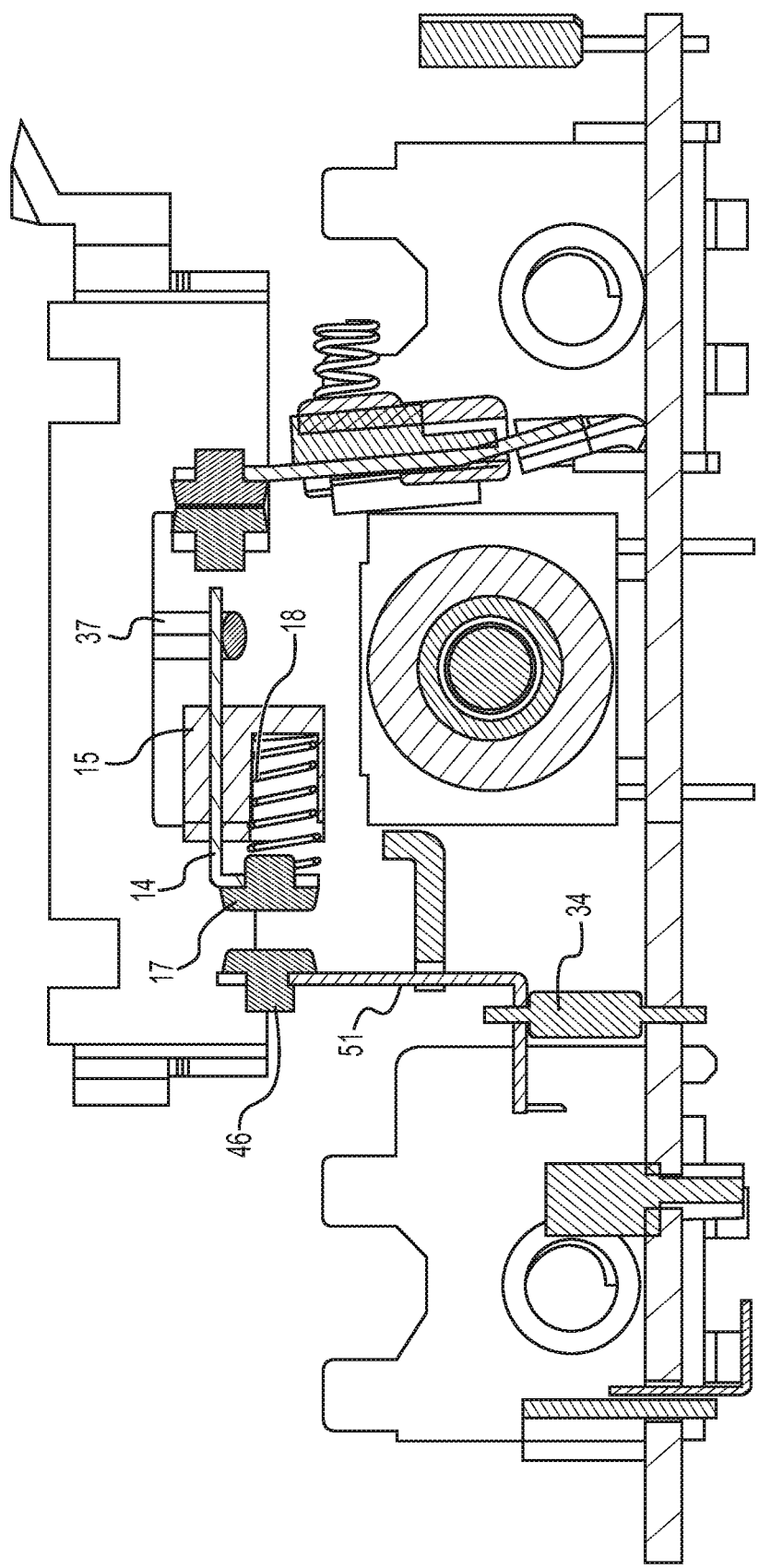
FIG. 6D is a longitudinal sectional view of an electric leakage protection tripping action according to an embodiment of the present disclosure.

FIG. 6D is a longitudinal sectional view of an electric leakage protection tripping action according to an embodiment of the present disclosure. The shown components are slider movable contact piece 14, slider 15, slider movable contact 17, slider movable contact spring 18, self-detection resistor 34, oxygen-free soft glue wire 37, 20 A static piece contact 46, and power input static piece 51.

The tripping process illustrated in the preceding paragraphs may also be initiated when MCU provides a trigger signal at TRIG1 in response to determining the presence of an electrical fault occurrence.

Further, in alternative embodiments, a trigger signal may be delivered as a result of a different type of fault, such as an arc fault, or in response to a remote command.

Figure 7A:
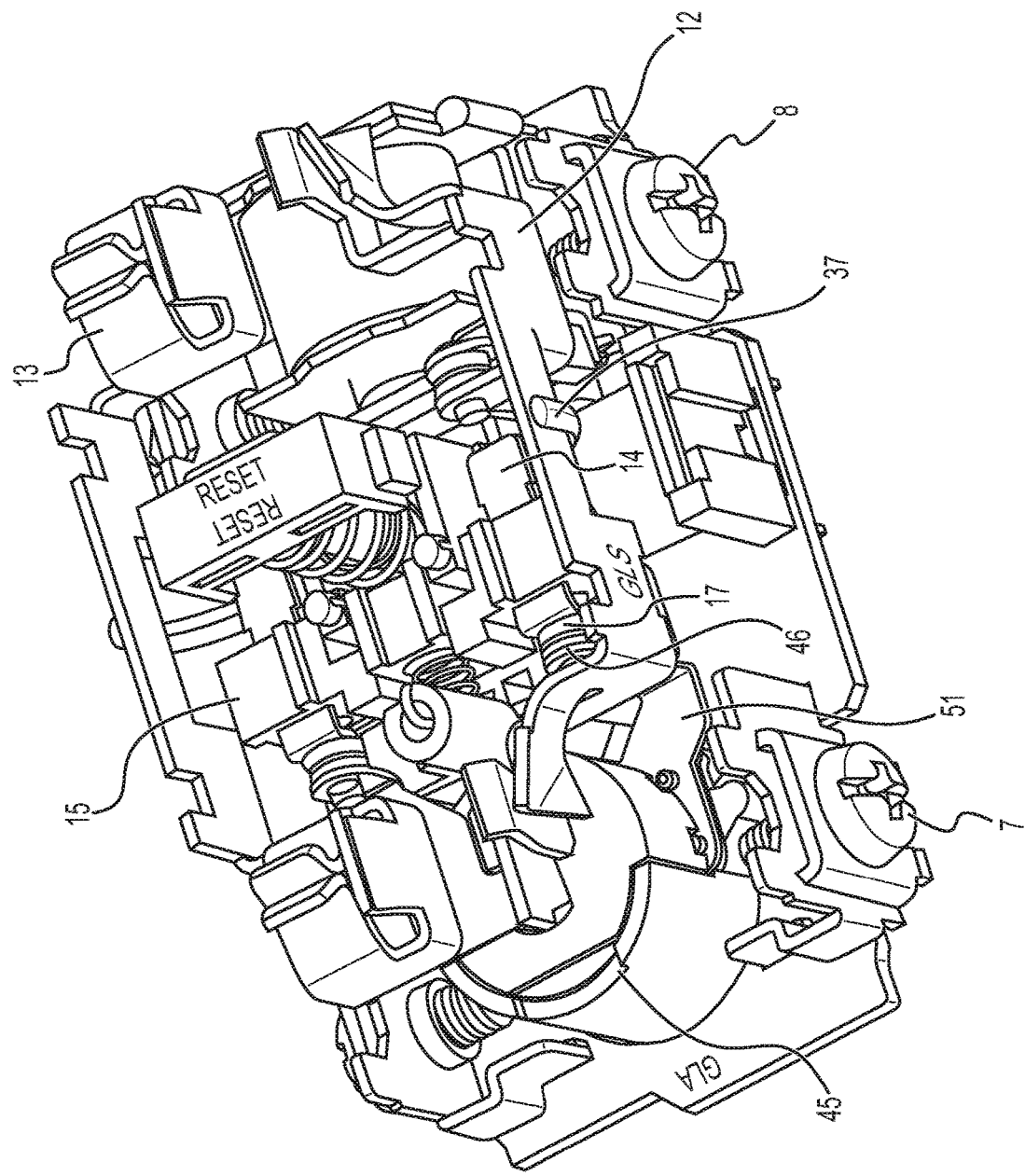
FIG. 7A is a structure diagram of conductive resetting of major parts, consistent with the present disclosure.

FIG. 7A shows the conductive resetting of major parts; specifically, a power input connection line component 7, an output terminal connection line component 8, a power input static piece 51, a slider moving contact piece 14, the slider 15, a slider moving contact piece silver contact 17, a magnetic ring cover static piece contact 46, the 15 A static piece 12, the 20 A static piece 13, the oxygen-free soft glue wire 37, and a magnetic ring base 45, according to an embodiment of the present disclosure.

Figure 7B:
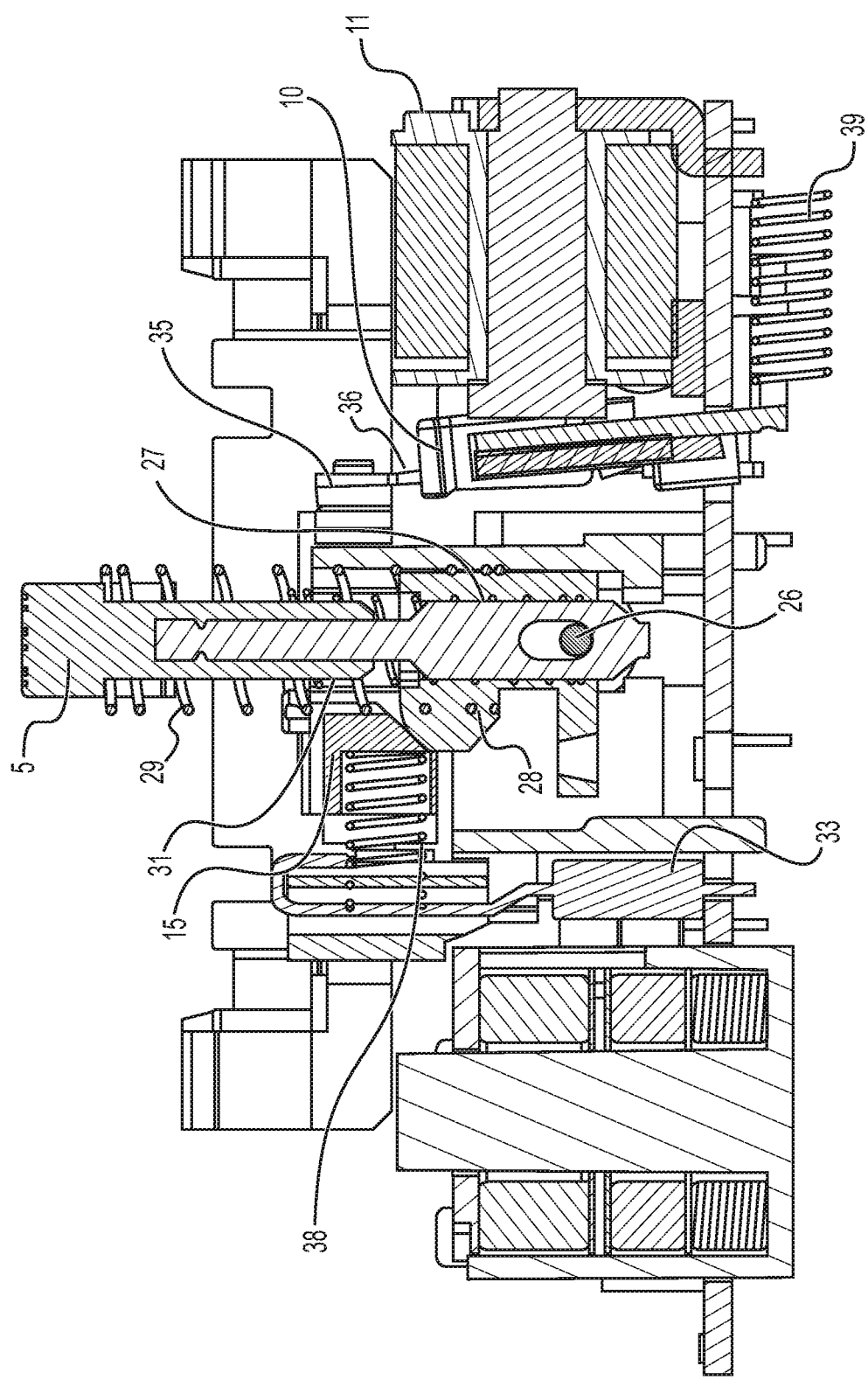
FIG. 7B is a longitudinal sectional view of a resetting action according to an embodiment of the present disclosure.

FIG. 7B shows a view of a resetting action according to an embodiment of the present disclosure, comprising reset button 5, slider 15, trip coil iron core 26, reset slide carriage 27, reset slide 28, reset button spring 29, slide reset spring 31, test resistor 33, relay movable piece contact 35, relay movable piece 36, slider spring 38, relay tension spring 39, relay movable piece component 10, and relay component 11.

Figure 7C:
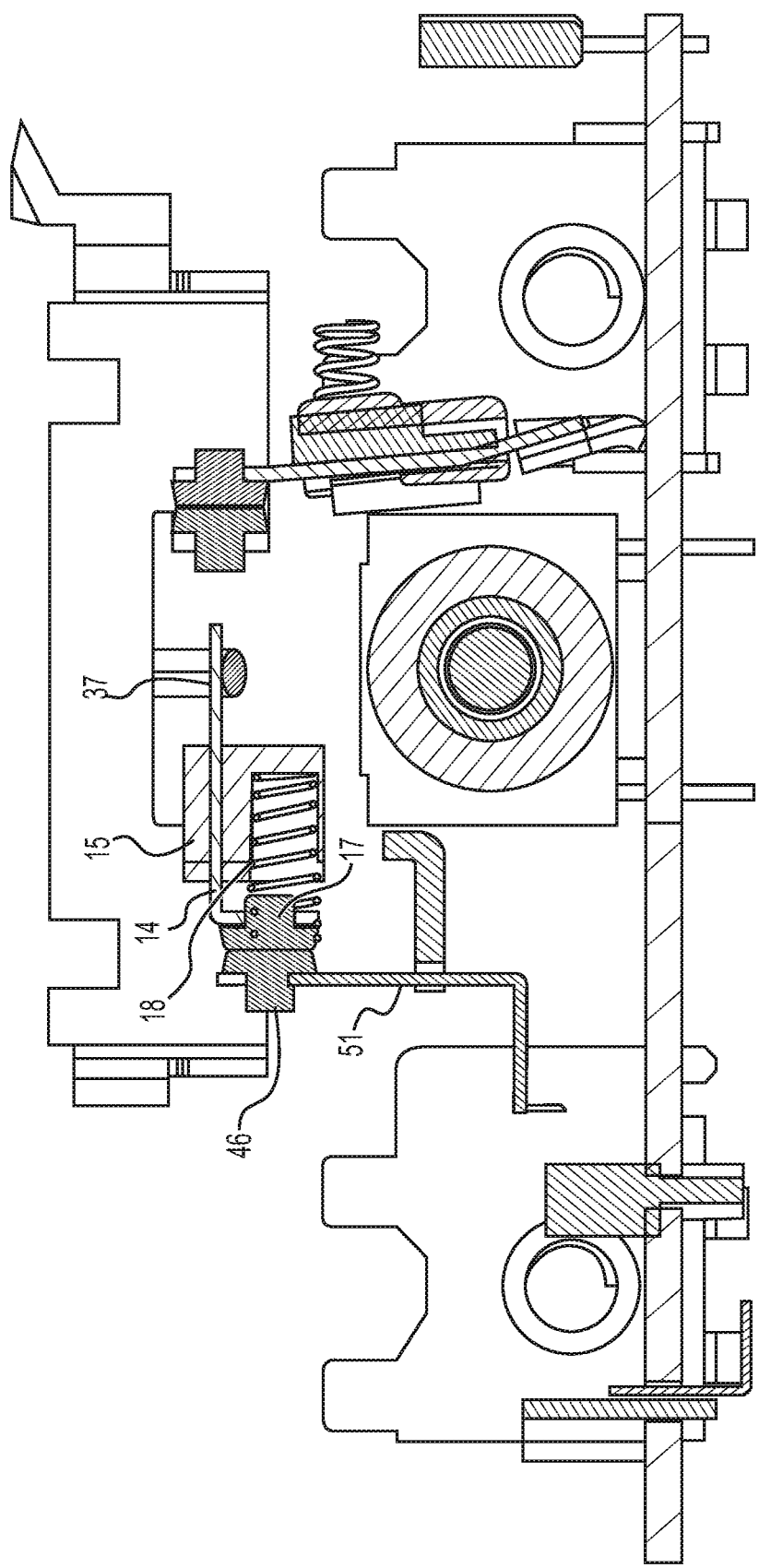
FIG. 7C is a longitudinal sectional view of a resetting action according to an embodiment of the present disclosure.

FIG. 7C shows a view of a resetting action according to an embodiment of the present disclosure. Components comprise slider movable contact piece 14, slider 15, slider movable contact piece silver contact 17, slider movable contact spring 18, self-detection resistor 34, oxygen-free soft glue wire 37, magnetic ring cover static piece contact 46, and power input static piece 51.

Figure 7D:
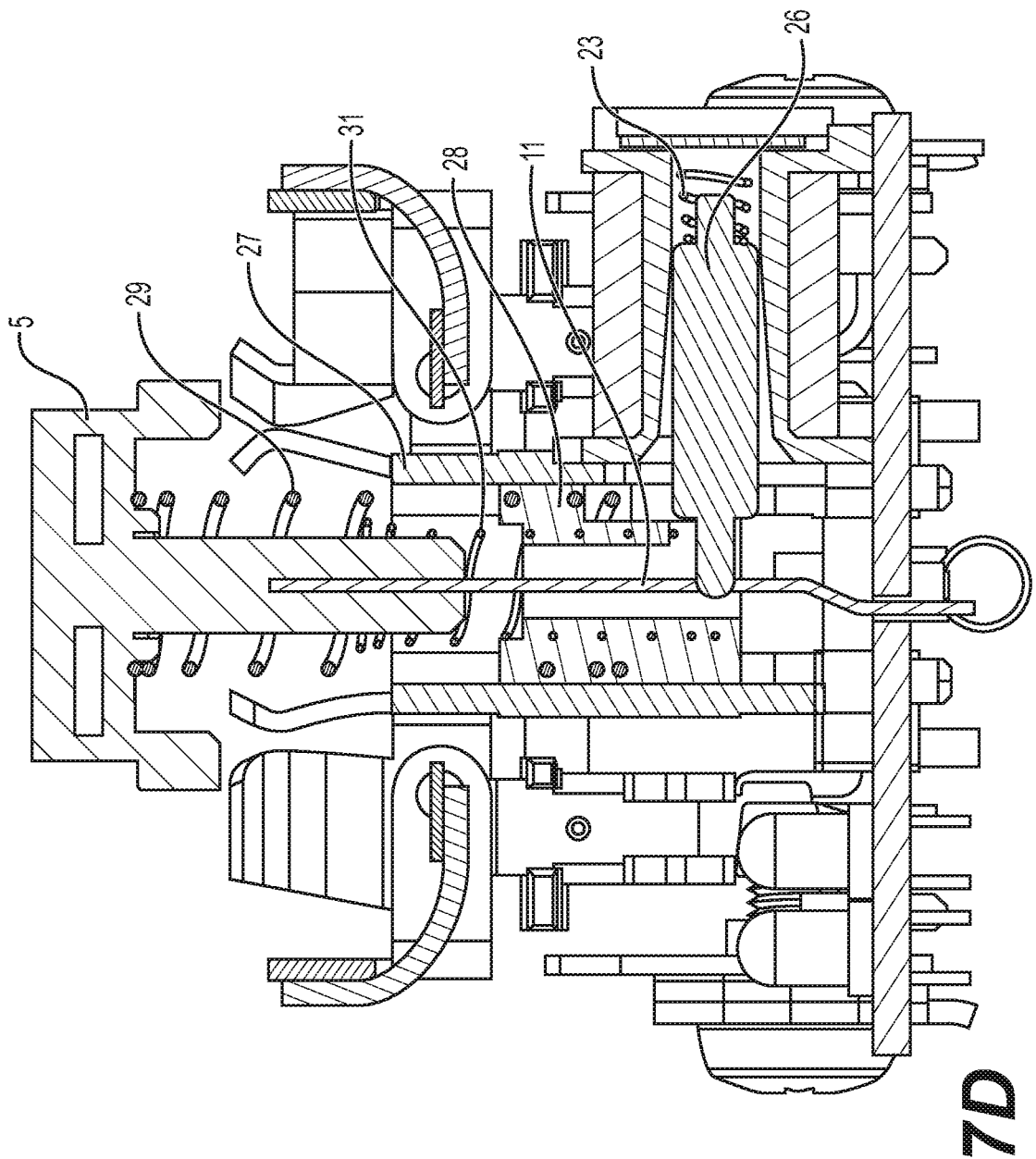
FIG. 7D is a transverse sectional view 1 of a resetting action according to an embodiment of the present disclosure.

FIG. 7D shows a transverse sectional view of a resetting action according to an embodiment of the present disclosure. Components comprise reset button 5, reset button stainless steel sheet 11, trip coil spring 23, trip coil iron core 26, reset slide carriage 27, reset slide 28, slide reset spring 31, and reset button spring 29.

Figure 7E:
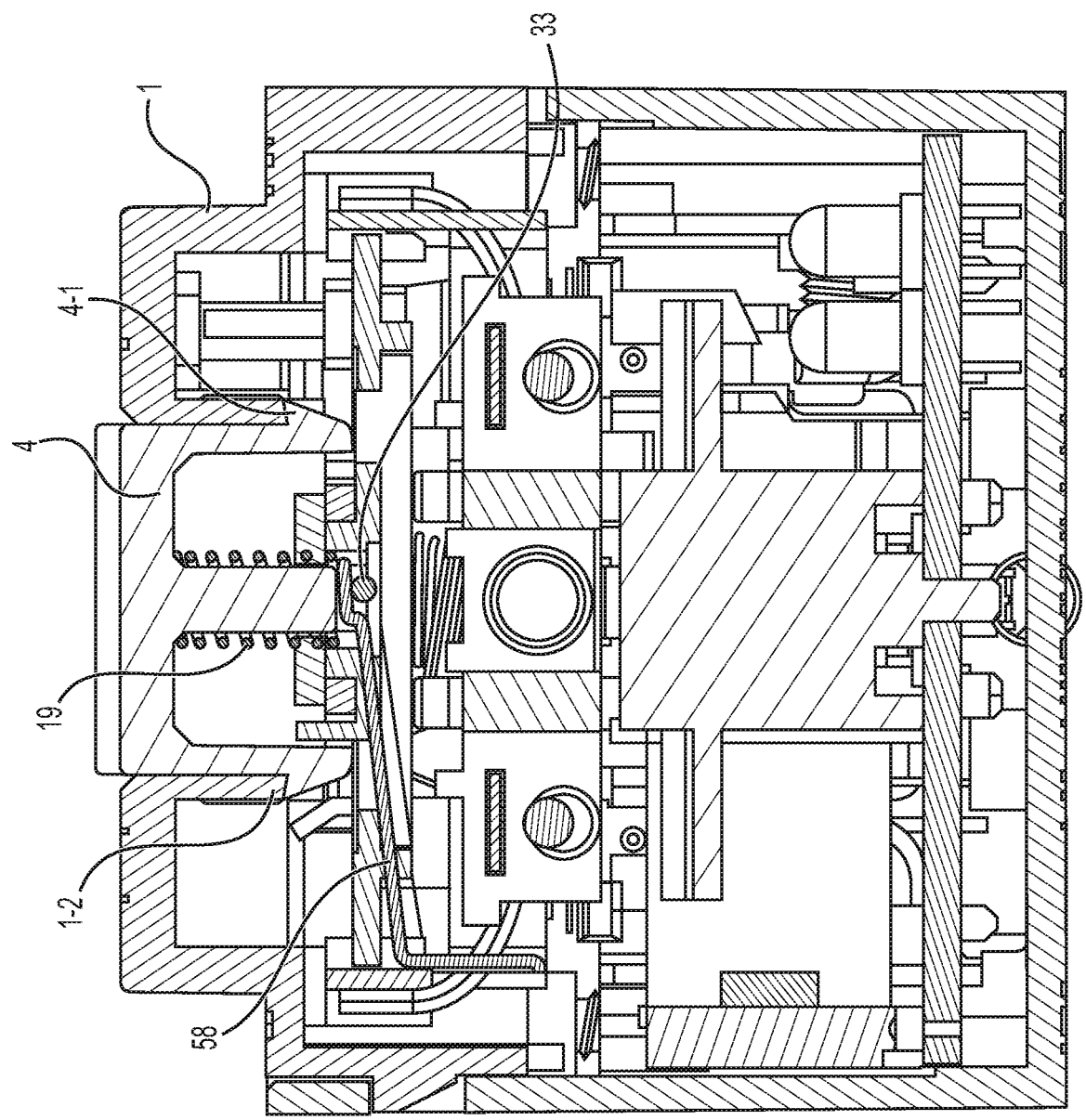
FIG. 7E is a transverse sectional view of a resetting action according to an embodiment of the present disclosure.

FIG. 7E shows a transverse sectional view of a resetting action according to an embodiment of the present disclosure. Components comprise upper cover 1, upper cover test button snap 1-2, test button 4, test button snap 4-1, test resistor 33, and test button spring 19.

Figure 8:
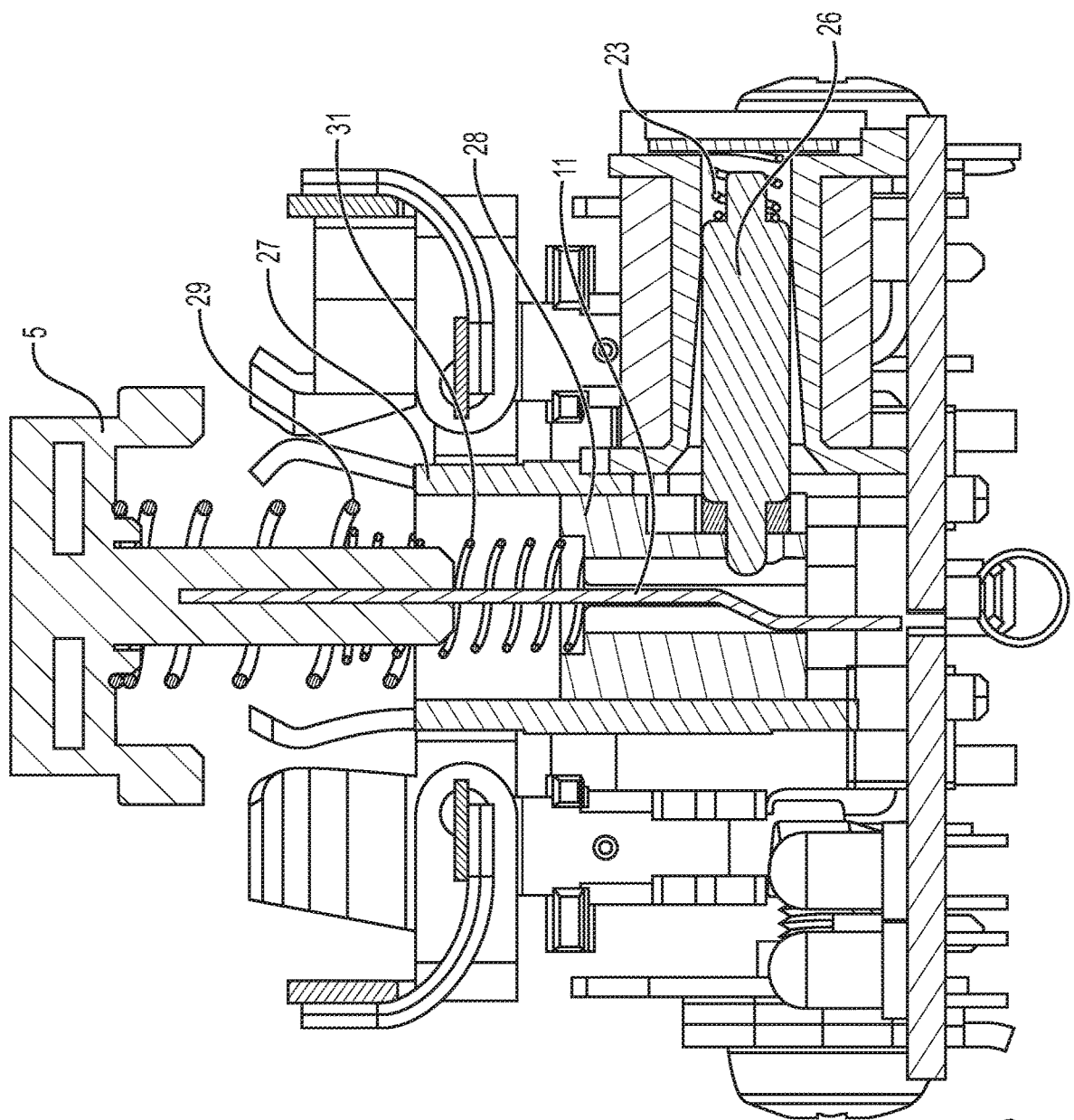
FIG. 8 is a longitudinal sectional view of a life terminating action according to an embodiment of the present disclosure.

FIG. 8 shows a longitudinal sectional view of a life terminating action according to an embodiment of the present disclosure. Components comprise reset button 5, reset button stainless steel sheet 11, trip coil spring 23, trip coil iron core 26, slide reset carriage 27, slide reset spring 28, reset button spring 29, and slide reset spring 31.

Figure 9:
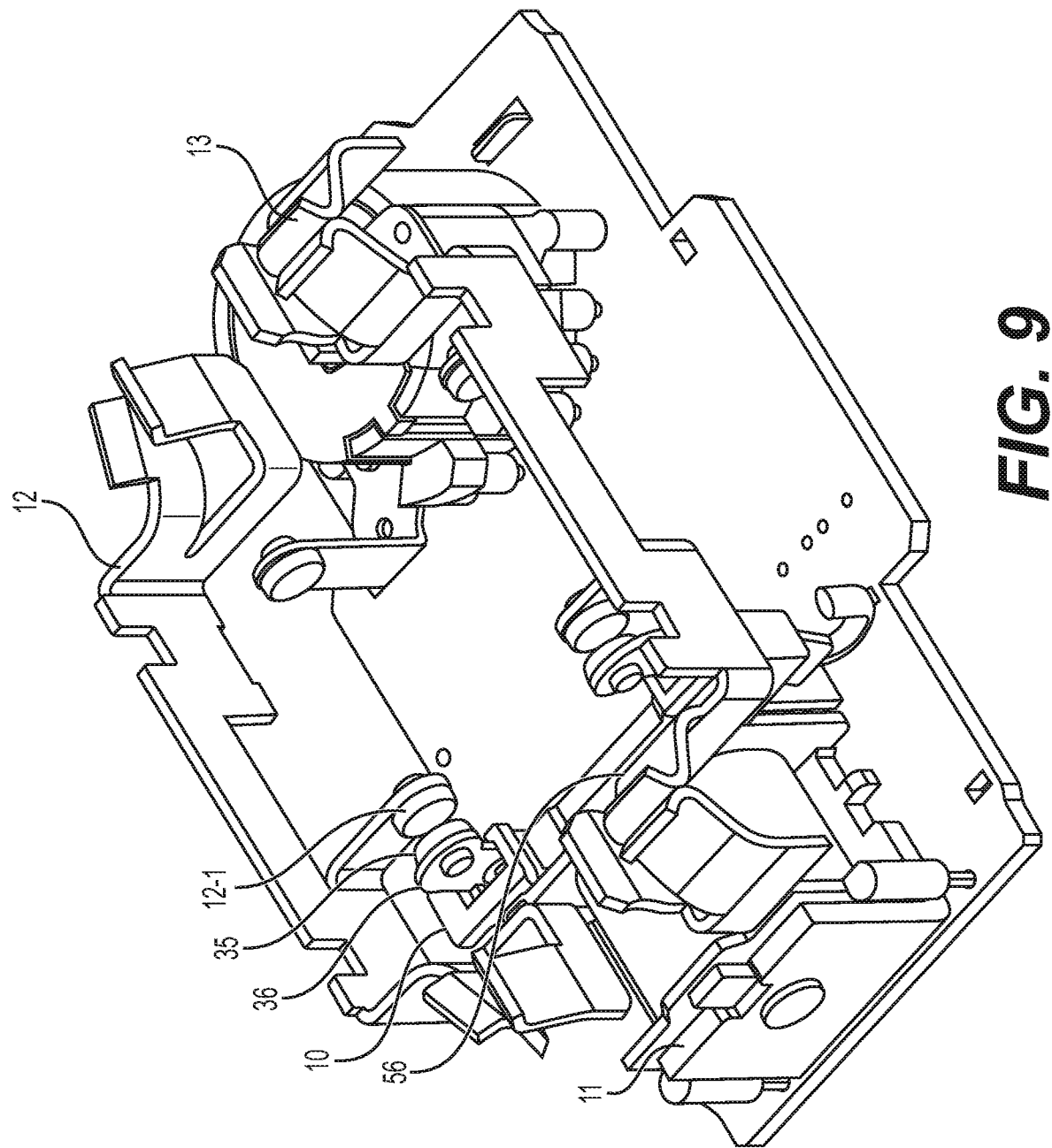
FIG. 9 is a sectional view of a power input end reverse wiring failure according to an embodiment of the present disclosure.

FIG. 9 shows a sectional view of a power input end reverse wiring failure according to an embodiment of the present disclosure. Components comprise relay component 11, relay movable piece component 10, relay movable piece contact 35, relay movable piece 36, 15 A static piece 12, 20 A static piece 13, 20 A static piece contact 12-1, and relay movable piece suction plate 56.

Figure 10:
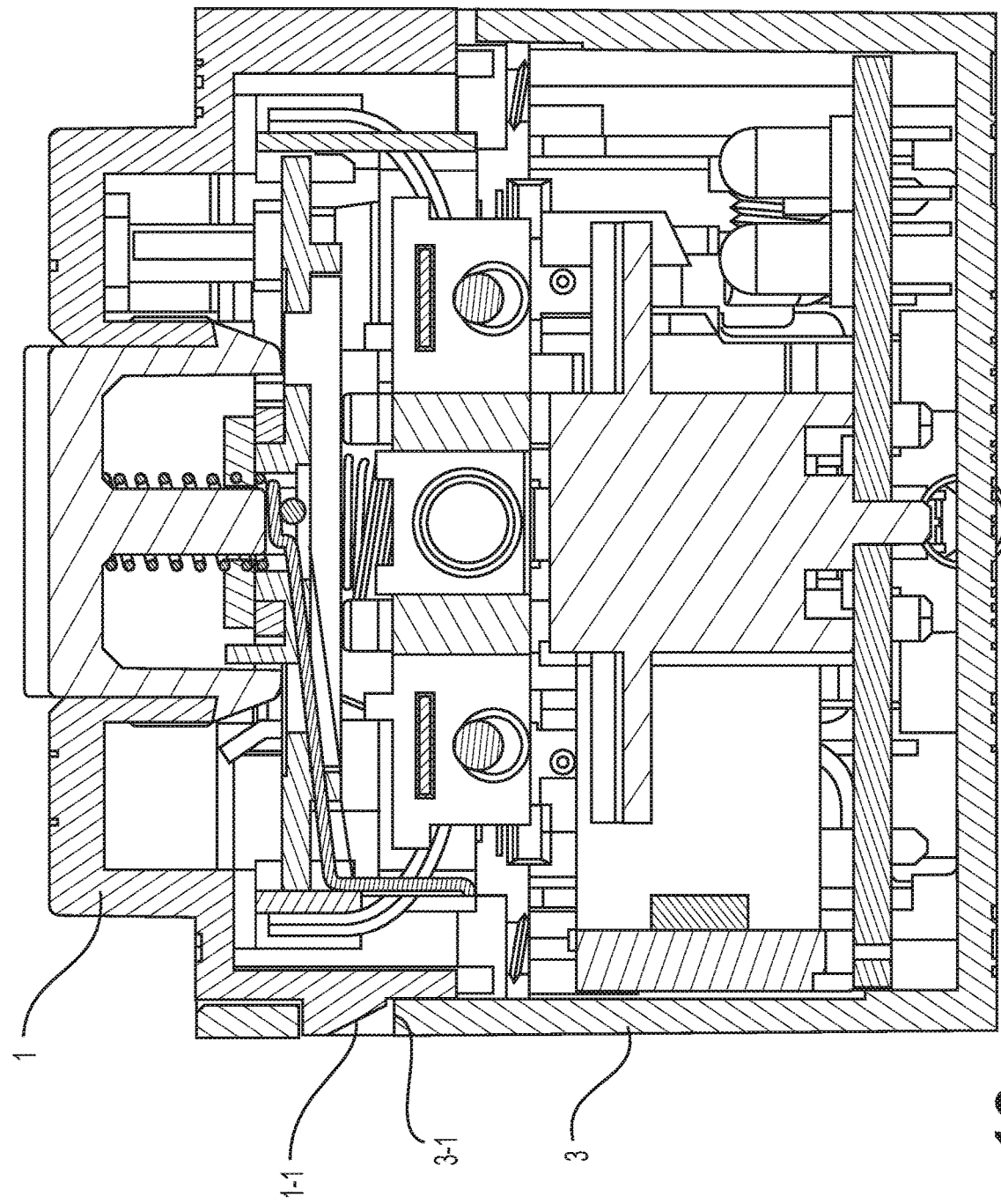
FIG. 10 is a longitudinal sectional view where assembly of a bottom case and a face shell adopts a snap position fixing manner according to an embodiment of the present disclosure.

FIG. 10 shows a longitudinal sectional view where assembly of a bottom case and a face shell adopts a snap position fixing manner according to an embodiment of the present disclosure. On the upper cover 1 there are provided with two snap positions 1-1, on the bottom case 3 there are provided with two snap position holes 3-1, an intermediate portion of the bottom case and the face shell is fixed in the form of a snap position, and four corners are fixed by using screws.

Figure 11:
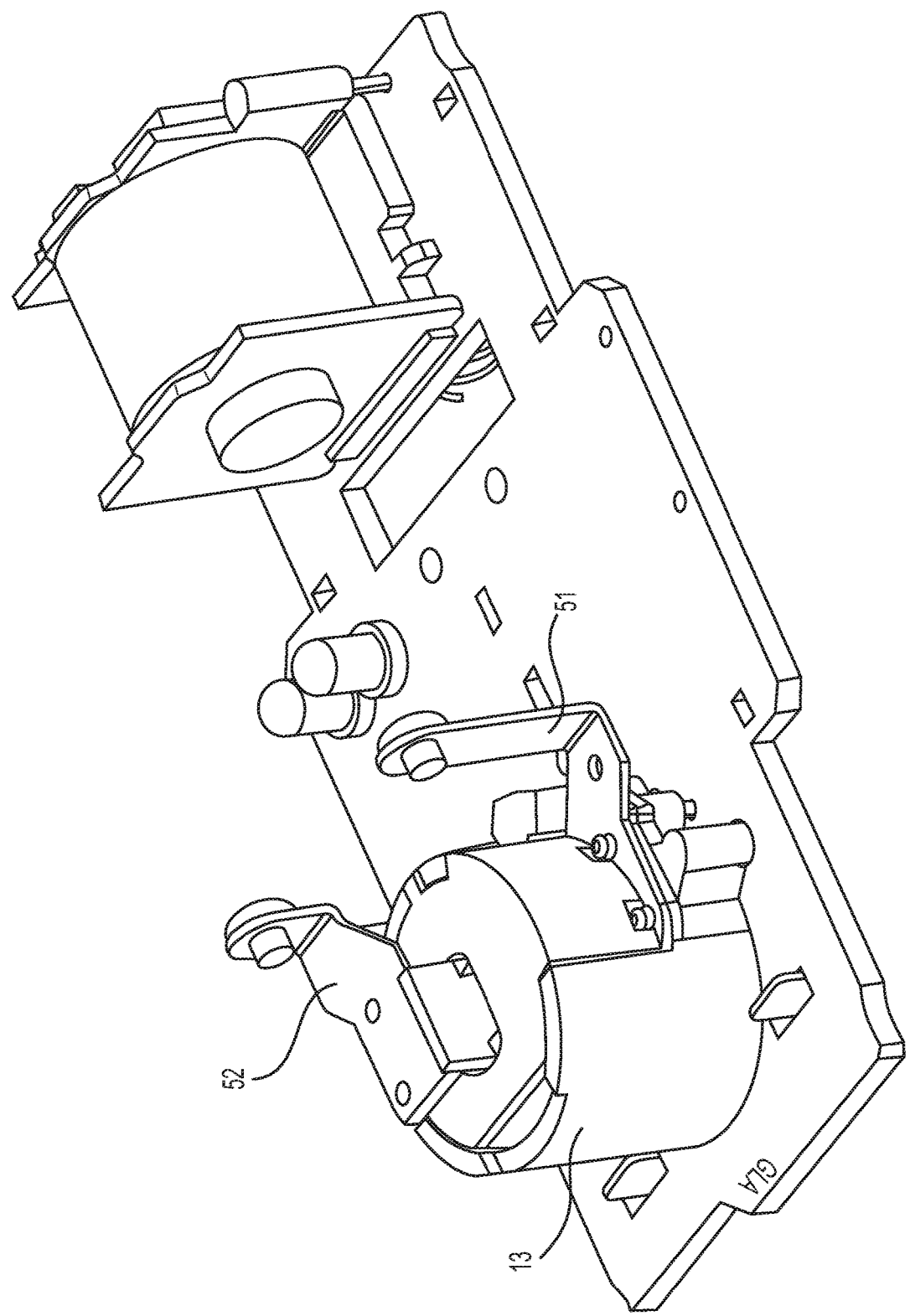
FIG. 11 is a schematic diagram of the position design of a power input static piece.

FIG. 11 shows the position design of a power input static piece, with the power input static piece 51 and the power input static piece 52 in the power input component 13 adopting a design mode of one over one under as well as one left and one right, according to an embodiment of the present disclosure.

Figure 12:
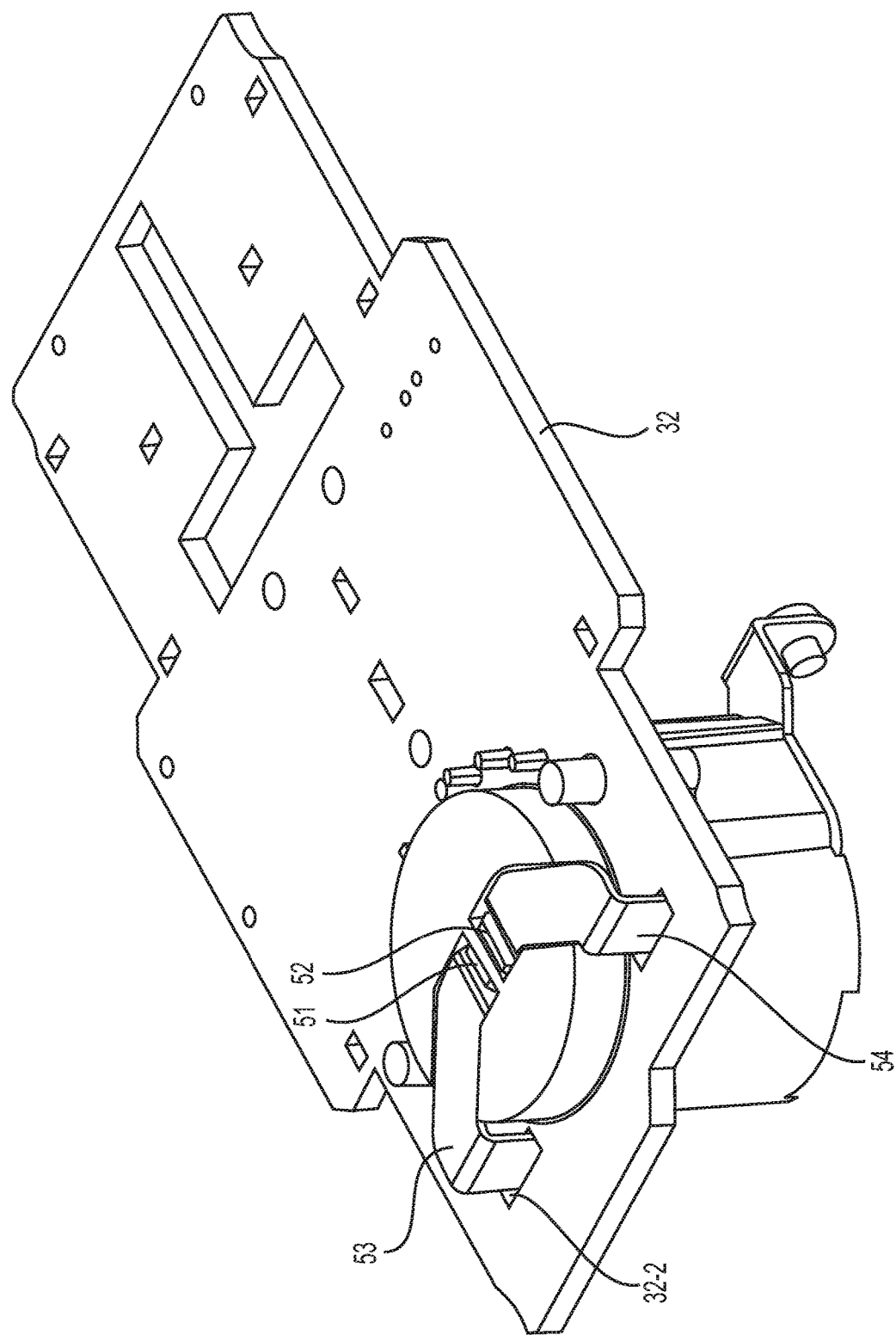
FIG. 12 is a schematic design diagram of a connection mode of power input connection straps according to an embodiment of the present disclosure.

FIG. 12 shows a schematic design diagram of a connection mode of power input connection straps according to an embodiment of the present disclosure, with components comprising the power input connection strap 53 and the power input connection strap 54 adopting a hook design, and are welded together with main board holes 32-2 and 32-3 and the power input static piece 53 and the power input static piece 54.

Figure 13:
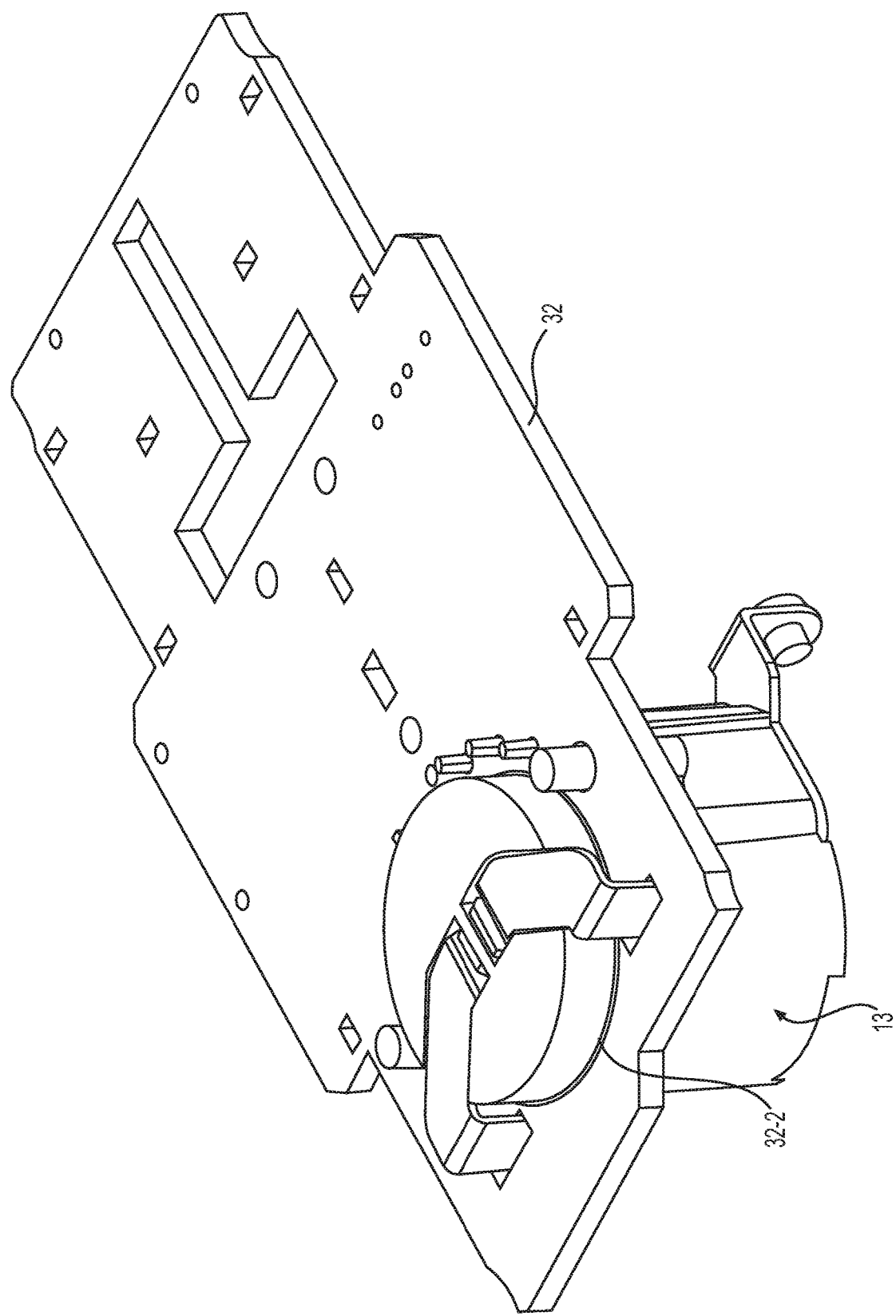
FIG. 13 is a schematic diagram of a hole 32-1 of the main board 32 according to an embodiment of the present disclosure.

FIG. 13 is a schematic diagram of a hole 32-1 of the main board 32 according to an embodiment of the present disclosure (the power input component 13 passes through the main board hole 32-1.

Figure 14:
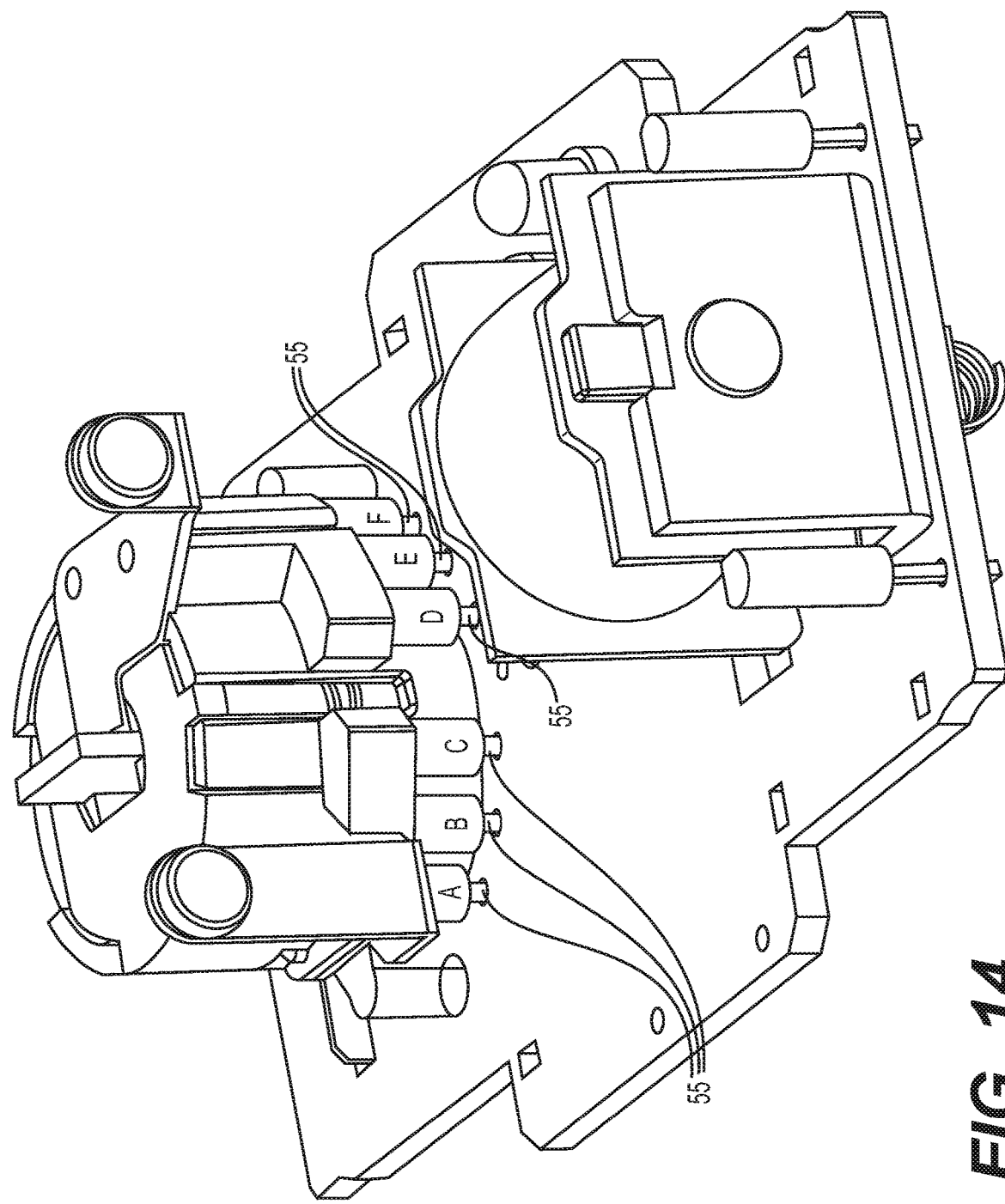
FIG. 14 is a schematic diagram of a method of fixing and connecting six pins of an electromagnetic ring according to an embodiment of the present disclosure.

FIG. 14 shows a schematic diagram of a method of fixing and connecting six pins of an electromagnetic ring according to an embodiment of the present disclosure, components comprising six electromagnetic ring pins 55 in the power input component 13, which are divided into three groups, and are respectively connected to input wires and output wires of the current detection magnetic ring 41, the electric leakage detection magnetic ring 43, and the grounding detection magnetic ring 44.

Figure 2:
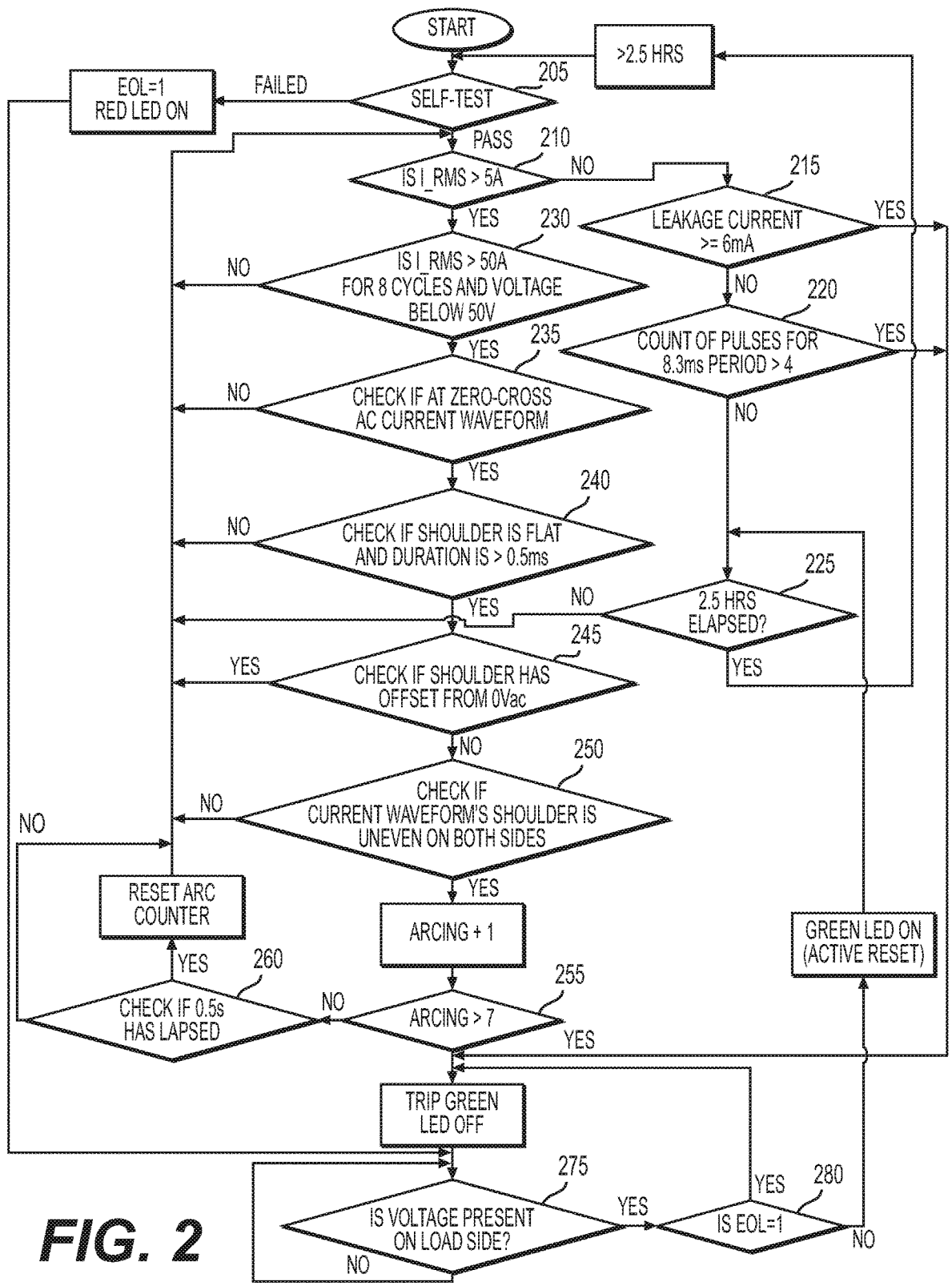
FIG. 2 is a flow diagram of an exemplary method of operation for a processor of a hybrid circuit interrupter, consistent with the present disclosure.

FIG. 2 provides an exemplary algorithm 200 for operation of HCI 400, consistent with the instant disclosure. More generally, the steps of this algorithm may be performed by MCU or another computing device, in concert with other elements of HCI circuitry 300. Software embodying the algorithms may be stored in non-volatile storage and/or memory within or outside of a processing device and may be executed by the processing device. As would be apparent to persons of skill in the art, the exact order of certain steps of the disclosed exemplary algorithm embodiments may be altered while still practicing the disclosed algorithms. Similarly, certain steps of the disclosed algorithm embodiments may be substituted, combined, or removed while still practicing the disclosed algorithms—consistent with the disclosure herein and/or as would be apparent to persons of skill in the art.

The general process flow of the MCU is shown in FIG. 2, which governs the functions, such as primarily 1) a self-test process; AFCI classification and determination; dedicated parallel ARC determination; EOL determination; trip mechanism process; and the active reset procedure.

As in step 205, MCU 221 may perform a self-test of HCI circuit 300 upon power up, or periodically; for example, once every 2.5 hours. With reference to the leakage simulation circuit depicted in FIG. 3, this self-test may comprise MCU providing a signal at MCU_SIMULATION to switch on an SCR and allow current to flow to ground, through R9 in this example. This self-test may be to assure that HCI circuitry 300 is able to properly detect a leakage current. If the simulated leakage current is detected, the self-test may be considered passed. MCU may then indicate that the HCI circuit 300 is normally operating by energizing, for example, a sold green LED indicator that is preferably visible on the face of the HCL device. The GFCI circuitry and functions and AFCI circuitry and functions are tested during the test. If the test is passed, the process may proceed to step 210.

As in step 210, the MCU may monitor the current of supplied power to see if the current is over 5 A, which is a dangerous arcing level as defined in the UL. If no, the process may proceed to step 215; if yes, the process proceeds to step 230.

As in step 215, the MCU may, using the GFCI circuitry, check if the leakage current is 6 mA or higher. If yes, the device is tripped (and the green LED is turned off) and the process may proceed to step 275. Otherwise, the process continues to step 220.

As in step 220, the MCU may check to see if the number of pulses from GFCI circuitry is 5 or more. If yes, the device is tripped (and the green LED is turned off) and the process may proceed to step 275. Otherwise, the process continues to step 225.

As in step 225, the MCU may determine if 2.5 hours has passed since the last self-test. If so, the process returns to step 205. Otherwise, the process returns to step 210.

As in step 230, the MCU determines if the current is over 50 A for 8 cycles with the voltage over 50V. If yes, then the process may proceed to step 235. If no, the process returns to step 210.

As in step 235, the MCU may determine whether the MCU's sampling is at the zero-cross point of the AC current waveform. If yes, the process proceeds to step 240. If no, the process returns to step 210.

As in step 240, the MCU determines if the shoulder is flat and the duration is greater than 0.5 ms. If yes, the process proceeds to step 245. If no, the process returns to step 210.

As in step 245, the MCU checks the AC current waveform to determine if there is any offset voltage on the shoulder. The offset is measured from the neutral reference voltage of 0V (zero volt). This is to determine if an arcing may have occurred. If yes, the process proceeds to step 250. If no, the process returns to step 210.

As in step 250, the MCU compares the duration of the waveform's shoulder to see if the sides of the shoulder are uneven. If no, it indicates certain appliances may be operating where such behavior indicates normal operation; for example, a bulb dimmer or switch power supply which would have a similar waveform pattern; thus, a no determination means the process returns to step 210. If ues, the arcing counter is increased by 1 and the process proceeds to step 255.

As in step 255, the MCU determines if the arc counter is greater than or equal to 7. If yes, then the device is tripped (and the green LED is turned off) and the process proceeds to step 275. If no, the process proceeds to step 260.

As in step 260, the MCU may determine if 0.5 seconds has lapsed since a prior arc event. If yes, the arcing counter is reset and the process returns to step 210. If no, the process proceeds to step 210 without resetting the arcing counter.

As in step 275, MCU may determine if voltage is present on the load side. If yes, the reset button may have been actuated, and the process proceeds to step 280. Otherwise, the process recursively calls step 275 (that is, the MCU monitors for voltage on the load side).

As in step 280, the MCU may determine if the device is in EOL. If yes, the system trips (and the green LED is turned off) and the process returns to step 275. If no, the MCU resets the device (and the green LED is turned on) and the process proceeds to step 225.

In some embodiments, in addition to or alternatively to the self-test procedure, MCU may periodically monitor its the operating conditions, for example, input voltage and input current to ensure normal operating conditions. As an example, step 205, discussed above, may be included in such monitoring instead of its position within the flowchart of FIG. 2. Such monitoring may proceed, for example, every 10-15 minutes. In the event that there is an abnormal operating condition detected during the constantly monitoring process, MCU may cause a red LED to blink as an indication of such an error. Thus, if such a situation persists, a user may be alerted to investigate possible causes of such irregularities by the blinking red LED.

Figure 15:
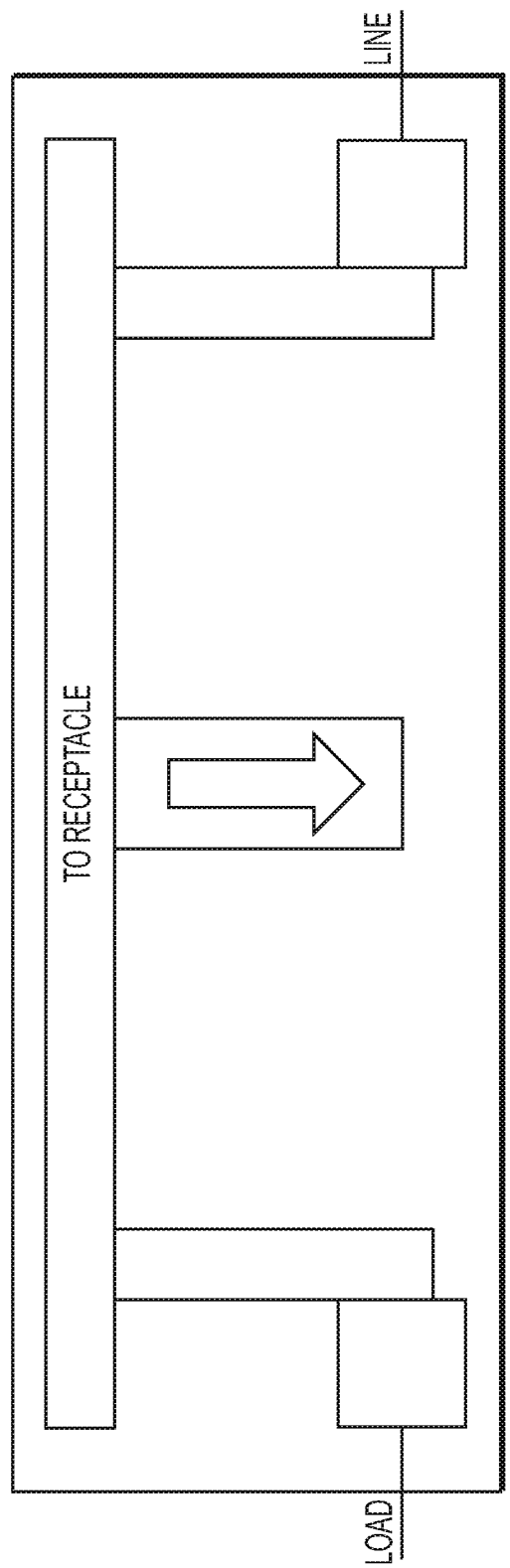
FIG. 15 is a side view of a universal reversible connecting structure.

In some embodiments, the present hybrid device is designed with a universal reversible connecting architecture, allowing the full operation or full function of both the AFCI and/or GFCI even if the installation connecting structure is done in reversed manner. In the symbolic description of the universal reversible connecting structure and its operation, a line is defined as the supply voltage which the GFCI will deliver to an appliance which is connected to its jack, (input connector 5), and a load is where voltage will be supplied to other sockets in the home or office where the socket does not necessarily be a GFCI unit and can be a simple socket. (output connector 8). When the hybrid device is in normal operation and the unit is not in TRIP position the line (copper line) and the load (outlet copper line) will be in contact with each other. However, for UL compliance and certification, it is required that the operation of the hybrid device deny power to the jack if the wiring is reversed, as shown in FIG. 15. That is, where the line connected to output connector and load side connected to input connector.

Figure 16:
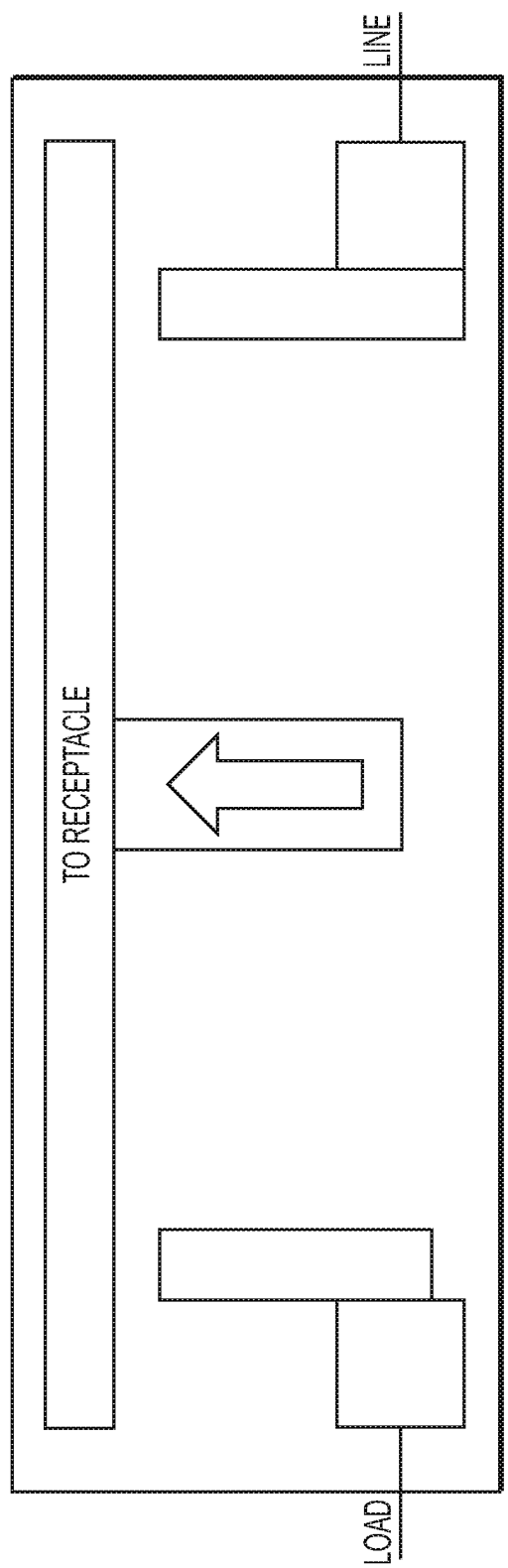
FIG. 16 is a side view of a universal reversible connecting structure in tripped position.
Figure 17:
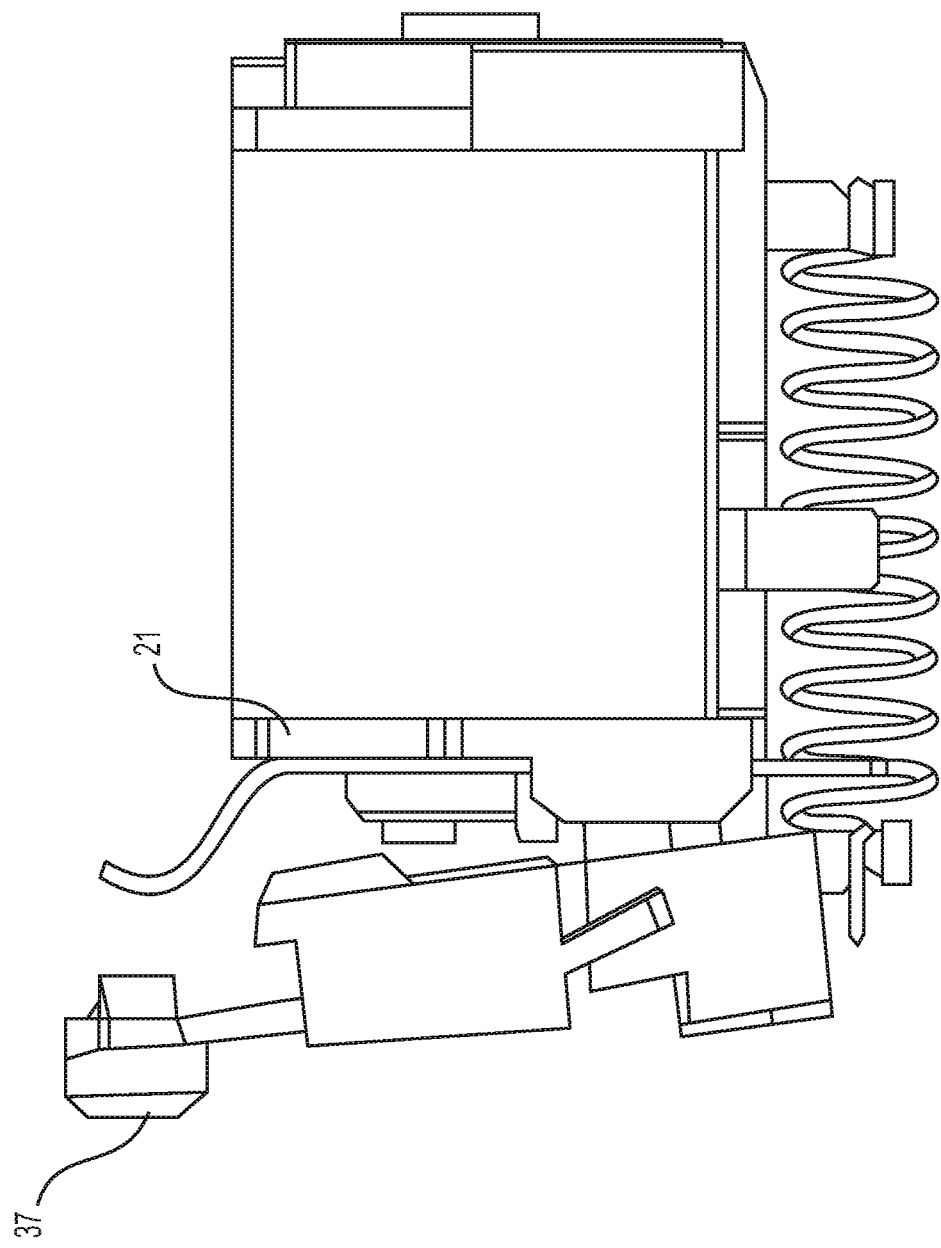
FIG. 17 shows the movable contact and relay assembly of a universal reversible connecting structure.

When a current leakage of 6 mA or more is detected the present Invention Combo Device unit will trip, as shown in FIG. 16. When the supply voltage which comes from the power grid is connected to the load side of the hybrid device instead of the line side the hybrid device's relay positioned on the load side will cause the "outlet" to be disconnected from the power source thus denying any power to the outlet. When the GFCI is reversed connected (i.e., line connected to output connector and load side connected to input connector). The relay on the load side will not be energized and thus the movable contact will not be engaged the power supply input connection assembly. The hybrid device function even with reverse wiring would require the load and line to be connected to each other with a single connector for power supply or on the main board. FIG. 17 shows the movable contact and relay assembly of the universal reversable connecting structure.

The current sensing coil would require energy to follow from the input supply connection to the outlet in order for the current sensing coil to detect any imbalance in current flow. When there is an identified fault (AFCI and/or GFCI) detected on either side of the input supply connection the hybrid device will trip and deny voltage to the jack. The jack will only have voltage on reset will the jack have voltage.

In the preceding specification, various embodiments have been described with reference to the accompanying drawings. It will, however, be evident that various other modifications and changes may be made thereto, and additional embodiments may also be implemented, without departing from the broader scope of the invention as set forth in the claims that follow.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

We claim:

1. A hybrid circuit interrupter, comprising:
   a three-coil architecture comprising:
      a coil housing;
      a first coil disposed within the coil housing;
      a second coil disposed within the coil housing;
      a third coil disposed within the coil housing;
      where the first, second, and third coils are parallel and the interior of the first coil is aligned with the second coil and the interior of the second coil is aligned with the third coil and
      a plurality of coil assembly conductors at least partially disposed within the coil housing; and
   first coil circuitry connected to the first coil and configured to generate first coil signals;
   leakage detection circuitry connected to the second and third coils and configured to generate a leakage signal; and
   a main processing circuit comprising a processor, wherein the processor is configured to:
      receive the first coil signals from the first coil circuitry;
      receive the leakage signal from the leakage detection circuitry;
      determine whether an arc fault exists based on the first coil signals;
      determine whether a ground fault exists based on the leakage signal; and
      generate a first trigger signal if a ground fault, an arc fault, or both is determined to exist.

2. The hybrid circuit interrupter of claim 1, further comprising:
   a trip coil assembly,
   wherein the trip coil assembly is configured to trip the hybrid circuit interrupter upon receiving the first trigger signal.

3. The hybrid circuit interrupter of claim 1, wherein the first coil has 150-250 turns.

4. The hybrid circuit interrupter of claim 1, wherein the second coil has 900-1100 turns.

5. The hybrid circuit interrupter of claim 1, wherein the third coil has 900-1100 turns.

6. The hybrid circuit interrupter of claim 1, wherein the coil housing comprises:
   a first mylar; and
   a second mylar;
   wherein
      the first mylar is parallel to and aligned directly beneath the first coil; and
      the second mylar is parallel to and aligned directly beneath the second coil.

7. The hybrid circuit interrupter of claim 1, wherein the plurality of coil assembly conductors comprises:
   a first coil assembly input conductor;
   a second coil assembly input conductor;
   a first coil assembly output conductor; and
   a second coil assembly output conductor.

8. The hybrid circuit interrupter of claim 7, wherein a first portion of the first coil assembly input conductor extends through a hole in the main board; and
   wherein a second portion of the first coil assembly input conductor extends perpendicularly from the first portion in a partial arc towards and connecting to an input static contact; and wherein a first portion of the second coil assembly input conductor extends through a hole in the main board; and
   wherein a second portion of the second coil assembly input conductor extends perpendicularly from the first portion in a partial arc towards and connecting to an input static contact.

9. The hybrid circuit interrupter of claim 1, wherein the coil housing comprises:
   a first static input connector connected to the coil housing via a protrusion extending from the side of the coil housing such that the static input connector is perpendicular to the coil housing.

10. The hybrid circuit interrupter of claim 8, wherein the coil housing comprises:
    a second static input connector;
    wherein the second static input connector is connected to the top of the coil housing via a protrusion parallel to and extending perpendicularly from the top of the coil housing; and
    the second static input connector is perpendicular to the coil housing.

11. The hybrid circuit interrupter of claim 1, wherein the coil housing comprises:
    a first electromagnetic ring pin;
    a second electromagnetic ring pin;
    a third electromagnetic ring pin;
    a fourth electromagnetic ring pin;
    a fifth electromagnetic ring pin; and
    a sixth electromagnetic ring pin;
       wherein the first ring pin is attached to the input wire of the first coil;

the second ring pin is attached to the input wire of the second coil;

the third ring pin is attached to the input wire of the third coil;

the fourth ring pin is attached to the output wire of the first coil;

the fifth ring pin is attached to the output wire of the second coil; and the sixth ring pin is attached to the output wire of the third coil.

12. The hybrid circuit interrupter of claim 7, wherein:
the first coil assembly input conductor and the first coil assembly output conductor form a portion of a live line;
the second coil assembly input conductor and the second coil assembly output conductor form a portion of a neutral line; and
the plurality of coil assembly conductors are comprised of copper.

13. The hybrid circuit interrupter of claim 1, wherein the first coil signals comprise an RMS voltage signal, an RMS current signal, and a rectangular waveform derived from the RMS current signal.

14. The hybrid circuit interrupter of claim 12, wherein the processor is further configured to determine that an arc fault exists if:
a pulse-width of a low of the rectangular wave form exceeds a predetermined amount of time,
the maximum current of the rectangular wave form is above a current detection threshold, and
the duty cycle of the rectangular wave form is above a maximum duty cycle detection threshold or below a minimum duty cycle threshold for at least a threshold number of cycles within a predetermined measurement window.

15. The hybrid circuit interrupter of claim 14, wherein:
the predetermined amount of time is approximately 1 ms;
the current detection threshold is approximately 5 A;
the maximum duty cycle detection threshold is at or between 55% and 60%;
the minimum duty cycle detection threshold is at or between 40% and 45%;
the threshold number of cycles is 3.5 cycles of the duty cycle; and
the predetermined measurement window is at least 1.5 seconds.

16. The hybrid circuit interrupter of claim 13, wherein the processor is further configured to determine that an arc fault exists if:
the RMS current is greater than a maximum current threshold for at least a predetermined measurement window, and
the RMS voltage is less than a minimum voltage threshold for at least a predetermined measurement window.

17. The hybrid circuit interrupter of claim 16, wherein:
the maximum current threshold is approximately 70 A;
the minimum voltage threshold is approximately 50V; and
the predetermined measurement window is one AC period.

18. The hybrid circuit interrupter of claim 13, wherein the processor is further configured to determine that an arc fault exists if:
a pulse count of the rectangular wave form is more than that a predetermined pulse count for a predetermined number of periods.

19. The hybrid circuit interrupter of claim 18, wherein:
the predetermined pulse count is one pulse; and
the predetermined number of periods is one AC period.

20. The hybrid circuit interrupter of claim 1, further comprising a leakage simulation circuit.

21. The hybrid circuit interrupter of claim 1, further comprising a failsafe circuit, wherein:
the failsafe circuit is configured to provide an alert when power is provided to the hybrid circuit interrupter unless the processor provides a failsafe signal.

22. The hybrid circuit interrupter of claim 2, further comprising a reset button configured to be pressed by a user to reset the hybrid circuit interrupter from a tripped condition.

23. The hybrid circuit interrupter of claim 22, where the reset button, when engaged, causes voltage to flow from line side to load side;
the processor monitors for voltage on the load side via an opto-coupler;
and when the processor detects no voltage, resets the hybrid circuit interrupter.

24. The hybrid circuit interrupter of claim 21, where the reset button, when engaged, causes the processor to test for voltage on the load side via an opto-coupler;
and when the processor detects no voltage, resets the hybrid circuit interrupter.

25. The hybrid circuit of claim 2, where a live line is connected to an output connector and the load side connected to an input connector.

* * * * *